(12) United States Patent
Radloff et al.

(10) Patent No.: US 10,609,446 B2
(45) Date of Patent: Mar. 31, 2020

(54) SYSTEMS AND METHODS FOR PROVIDING BLACKOUT RECORDING AND SUMMARY INFORMATION

(71) Applicant: Rovi Guides, Inc., San Jose, CA (US)

(72) Inventors: Jon P. Radloff, Castle Rock, CO (US); Michael D. Ellis, Boulder, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/018,410

(22) Filed: Jun. 26, 2018

(65) Prior Publication Data

US 2018/0376196 A1    Dec. 27, 2018

Related U.S. Application Data

(63) Continuation of application No. 14/044,233, filed on Oct. 2, 2013, now Pat. No. 10,034,044, which is a (Continued)

(51) Int. Cl.
*H04N 21/44* (2011.01)
*H04N 21/2187* (2011.01)
(Continued)

(52) U.S. Cl.
CPC ....... *H04N 21/44008* (2013.01); *H04N 5/445* (2013.01); *H04N 21/2187* (2013.01);
(Continued)

(58) Field of Classification Search
CPC ............. H04N 21/254; H04N 21/2547; H04N 21/47202; H04N 21/4782; H04N 21/6125;
(Continued)

(56) References Cited

U.S. PATENT DOCUMENTS

| 4,694,490 A | 9/1987 | Harvey et al. |
| 4,706,121 A | 11/1987 | Young |

(Continued)

FOREIGN PATENT DOCUMENTS

| EP | 0721253 A2 | 7/1996 |
| WO | WO-1996009721 | 3/1996 |

(Continued)

OTHER PUBLICATIONS

"IS-60.3 Physical Layer and Medium Specifications. Part 3-CX Physical Layer & Medium Specification," CX Specification, Revised Mar. 19, 1992, Table of Contents (2 pp.) and pp. 1-41.

(Continued)

*Primary Examiner* — Chenea Davis
(74) *Attorney, Agent, or Firm* — Haley Guiliano LLP

(57) ABSTRACT

Systems and methods for providing blackout support in video mosaic and television environments are disclosed. In response to receiving a request for a video mosaic page, screen data or application data, which may include blackout information, is received. The blacked out content may be automatically recorded to the user equipment or a network server for later playback after the blackout has expired. In addition, an overlay of options associated with the blacked out asset may be presented. The overlay may include options to substitute the blacked out asset with replacement content, search for similar content, retrieve more information about the blackout, or present summary information, such as a sports ticker, in place of the blacked out cell.

18 Claims, 17 Drawing Sheets

Related U.S. Application Data continuation of application No. 11/796,416, filed on Apr. 27, 2007, now Pat. No. 8,578,416.

(51) Int. Cl.

| | | |
|---|---|---|
| *H04N 21/431* | (2011.01) | |
| *H04N 21/434* | (2011.01) | |
| *H04N 21/462* | (2011.01) | |
| *H04N 21/472* | (2011.01) | |
| *H04N 21/478* | (2011.01) | |
| *H04N 21/4786* | (2011.01) | |
| *H04N 21/488* | (2011.01) | |
| *H04N 21/81* | (2011.01) | |
| *H04N 21/84* | (2011.01) | |
| *H04N 5/445* | (2011.01) | |
| *H04N 21/433* | (2011.01) | |
| *H04N 21/45* | (2011.01) | |
| *H04N 21/485* | (2011.01) | |
| *G06Q 30/00* | (2012.01) | |

(52) U.S. Cl.
CPC ..... *H04N 21/4316* (2013.01); *H04N 21/4318* (2013.01); *H04N 21/4348* (2013.01); *H04N 21/4622* (2013.01); *H04N 21/4781* (2013.01); *H04N 21/4786* (2013.01); *H04N 21/47202* (2013.01); *H04N 21/47211* (2013.01); *H04N 21/4882* (2013.01); *H04N 21/4886* (2013.01); *H04N 21/812* (2013.01); *H04N 21/8126* (2013.01); *H04N 21/84* (2013.01); *G06Q 30/00* (2013.01); *H04N 21/4334* (2013.01); *H04N 21/4532* (2013.01); *H04N 21/485* (2013.01)

(58) Field of Classification Search
CPC .. H04N 21/812; H04N 21/8543; H04N 7/173; H04N 21/4433; H04N 21/4438; H04N 21/4622; H04N 21/4858; H04N 21/8193; H04N 5/44543; H04N 21/4334; H04N 21/44008; H04N 21/4627; H04N 21/6581; H04N 21/8456; H04N 5/913; H04N 7/17318; H04N 9/888
See application file for complete search history.

(56) References Cited

U.S. PATENT DOCUMENTS

| | | | |
|---|---|---|---|
| 4,739,510 A | 4/1988 | Jeffers et al. | |
| 4,965,825 A | 10/1990 | Harvey et al. | |
| 4,977,455 A | 12/1990 | Young | |
| 5,036,537 A | 7/1991 | Jeffers et al. | |
| 5,465,113 A | 11/1995 | Gilboy | |
| 5,519,780 A | 5/1996 | Woo et al. | |
| 5,559,548 A | 9/1996 | Davis et al. | |
| 5,583,576 A | 12/1996 | Perlman et al. | |
| 5,585,866 A | 12/1996 | Miller et al. | |
| 5,589,892 A | 12/1996 | Knee et al. | |
| 5,619,274 A | 4/1997 | Roop et al. | |
| 5,666,645 A | 9/1997 | Thomas et al. | |
| 5,699,107 A | 12/1997 | Lawler et al. | |
| 5,798,785 A | 8/1998 | Hendricks et al. | |
| 5,828,419 A | 10/1998 | Bruette et al. | |
| 5,907,323 A | 5/1999 | Lawler et al. | |
| 5,973,683 A | 10/1999 | Cragun et al. | |
| 5,978,649 A | 11/1999 | Kahn | |
| 6,002,394 A | 12/1999 | Schein et al. | |
| 6,020,910 A | 2/2000 | Schmidt et al. | |
| 6,108,365 A | 8/2000 | Rubin et al. | |
| 6,125,259 A | 9/2000 | Perlman | |
| 6,173,112 B1 | 1/2001 | Gruse et al. | |
| 6,208,799 B1 | 3/2001 | Marsh et al. | |
| 6,240,555 B1 | 5/2001 | Shoff et al. | |
| 6,275,268 B1 | 8/2001 | Ellis et al. | |
| 6,314,571 B1 | 11/2001 | Ogawa et al. | |
| 6,331,877 B1 | 12/2001 | Bennington et al. | |
| 6,434,621 B1 | 8/2002 | Pezzillo et al. | |
| 6,519,770 B2 | 2/2003 | Ford | |
| 6,536,041 B1 | 3/2003 | Knudson et al. | |
| 6,699,107 B2 | 3/2004 | Stoeckgen et al. | |
| 6,757,906 B1 | 6/2004 | Look et al. | |
| 6,772,435 B1 | 8/2004 | Thexton et al. | |
| 6,785,901 B1 | 8/2004 | Horiwitz et al. | |
| 6,785,904 B1 | 8/2004 | Franken et al. | |
| 6,829,781 B1 | 12/2004 | Bhagavath et al. | |
| 6,948,183 B1 | 9/2005 | Peterka | |
| 7,096,486 B1 | 8/2006 | Ukai et al. | |
| 7,162,729 B2 | 1/2007 | Schein et al. | |
| 7,370,343 B1 | 5/2008 | Ellis | |
| 7,523,477 B2 | 4/2009 | Ellis | |
| 7,530,085 B2 | 5/2009 | Tsuria et al. | |
| 7,594,177 B2 | 9/2009 | Jojic et al. | |
| 7,757,252 B1 * | 7/2010 | Agasse | H04N 5/44543 725/41 |
| 7,823,177 B2 | 10/2010 | Ellis | |
| 8,332,889 B2 | 12/2012 | Calzone | |
| 2001/0024565 A1 | 9/2001 | Yui et al. | |
| 2002/0056103 A1 | 5/2002 | Gong | |
| 2002/0078449 A1 | 6/2002 | Gordon et al. | |
| 2002/0157099 A1 | 10/2002 | Schrader et al. | |
| 2003/0028884 A1 | 2/2003 | Swart et al. | |
| 2003/0126594 A1 * | 7/2003 | Tsuria | H04N 7/165 725/25 |
| 2003/0217360 A1 | 11/2003 | Gordon et al. | |
| 2004/0168121 A1 | 8/2004 | Matz | |
| 2005/0015803 A1 | 1/2005 | Macrae et al. | |
| 2005/0165918 A1 | 7/2005 | Wantanabe et al. | |
| 2006/0248078 A1 | 11/2006 | Gross et al. | |
| 2007/0055989 A1 | 3/2007 | Shanks et al. | |
| 2007/0199015 A1 | 8/2007 | Lopez et al. | |
| 2007/0214477 A1 | 9/2007 | Read | |
| 2007/0214478 A1 | 9/2007 | Feldstein et al. | |
| 2007/0220551 A1 | 9/2007 | Shanks et al. | |
| 2007/0226765 A1 | 9/2007 | Bahnck et al. | |
| 2007/0234388 A1 | 10/2007 | King | |
| 2007/0250848 A1 * | 10/2007 | Gorti | H04H 20/38 725/14 |
| 2007/0294734 A1 | 12/2007 | Arsenault et al. | |
| 2008/0033992 A1 | 2/2008 | Sloo et al. | |
| 2008/0086743 A1 * | 4/2008 | Cheng | H04N 5/76 725/38 |
| 2008/0092157 A1 | 4/2008 | Walter et al. | |
| 2008/0168487 A1 * | 7/2008 | Chow | H04N 7/165 725/31 |
| 2008/0256569 A1 | 10/2008 | Rhoades et al. | |
| 2013/0139211 A1 | 5/2013 | Gorti et al. | |

FOREIGN PATENT DOCUMENTS

| | | |
|---|---|---|
| WO | WO-1996017473 | 6/1996 |
| WO | WO-2000033560 | 6/2000 |
| WO | WO-2003026275 | 3/2003 |
| WO | WO-2004047440 | 6/2004 |

OTHER PUBLICATIONS

Davidson, Ken, "CEBus: A New Standard in Home Automation" Circuit Cellar Ink, pp. 40-52 (1989).

Hofmann, J., The Consumer Electronic Bus: An Integrated Multi-Media LAN for the Home, International Journal of Digital and Analog Communication Systems, vol. 4, No. 2, 1991, pp. 77-86.

M/A-COM Inc., "Videocipher II Satellite Descrambler Owner's Manual," dated prior to Feb. 1986.

O'Brien, Jr., T. E Physical and Media Specifications of the CXBus, IEEE Transactions on Consumer Electronics, vol. 37, No. 3, Aug. 1991, pp. 357-366.

StarSight Users Manual, copyright 1994.

* cited by examiner

SYSTEMS AND METHODS FOR PROVIDING BLACKOUT RECORDING AND SUMMARY INFORMATION

CROSS-REFERENCE TO RELATED APPLICATIONS

This application is a continuation of U.S. patent application Ser. No. 14/044,233, filed Oct. 2, 2013 (now allowed) which is a continuation of U.S. patent application Ser. No. 11/796,416, filed Apr. 27, 2007, now U.S. Pat. No. 8,578,416, issued Nov. 5, 2013, each of which are hereby incorporated by reference herein in their entireties.

BACKGROUND OF THE INVENTION

This invention relates generally to media systems and, more particularly, to blackout features in media systems.

Generally speaking, a programming blackout occurs when a video distribution facility does not make programming available for viewing to a subset of all possible viewers at the time it was scheduled to be distributed. For example, a broadcaster may be prohibited from broadcasting a sporting event if the broadcaster's signal reaches any area within a certain radius of the sports venue where the event is being played. The distribution facility may deliver replacement media (or no media at all) on the blacked out channel during the blackout period.

Three illustrative types of programming blackouts are bandwidth blackouts, affiliate protection blackouts, and venue protection blackouts. Bandwidth blackouts may occur when a program has larger than typical bandwidth requirements. For example, a sports program may require more bandwidth than a non-sports program due to its fast-action nature. When a sports program is broadcast, bandwidth may be borrowed from another channel in order to satisfy the increased bandwidth requirement of the sports program. Borrowing bandwidth from a channel may prevent the broadcast of a regularly scheduled program on that channel. Thus, a blackout of that regularly scheduled program occurs.

Affiliate protection blackouts may occur when the same program is scheduled to be broadcast on two separate channels, such as a local network affiliate and a national channel. In an attempt to protect the interests of the local network affiliate, the television service provider may blackout the commonly scheduled program on the national channel in the locality of the local network affiliate.

Venue protection blackouts may occur, for example, when the provider of a live event wants to protect the venue of the live event by preventing the event from being televised nearby. For example, when a sporting event, or other live event, is not sold out, the sports team or league may prohibit the broadcast of the event to any television viewer within a given distance from the sporting venue in an attempt to increase ticket sales and attendance for the event and for future events. Thus, a programming blackout may occur on the channel scheduled to broadcast the event in those locations.

There have been several solutions proposed for supporting programming blackouts. For a description of one such system for providing blackout features in interactive television program guides, see U.S. patent application Ser. No. 09/996,346, filed Nov. 28, 2001. However, due to the ever-increasing number of channels and services available in today's media guidance systems, user interfaces continue to evolve. For example, today video mosaic screens may present multiple video sources to a user in a single interactive application page. Such video mosaics enable users to access multiple services and/or assets from video-rich menu screens and displays.

Current blackout systems fail to adequately support video mosaic screens. With some video mosaics, the video sources that make up the mosaic may be remotely-generated. This means that the video sources are composited before reaching the user equipment and screen graphics, text, advertising, and other screen elements may be overlaid on the composited sources to form an interactive mosaic screen at the user equipment. One or more of these video sources may include national feeds that should be blacked out on a subset of the user equipment. This arrangement may result in video cells in a video mosaic screen presenting video that should in fact be blacked out in some locations.

For example, a user may request a remotely-generated sports genre video mosaic that displays a collection of six live sporting events. Each event may be presented in its own video cell or window in a video mosaic page. Two of the six sporting events may correspond to national television feeds that are blacked out on the user equipment due to one or more venue protection blackouts (e.g., the user is located within some geographic distance from the sporting event venue and the event is not sold out) and another sporting event may be blacked out due to an affiliate protection blackout (e.g., the event is also being broadcast on a local network channel). Current blackout systems are not capable of blacking out individual elements within a remotely-generated video mosaic; therefore, events may be presented in violation of the blackout. This is highly undesirable, as service operators are typically under contract not to broadcast blacked out content, yet the user still desires to have some content presented in place of the blacked out content and to be able to view the remainder of the video mosaic.

For locally-generated mosaics, blacked out content may be removed before reaching the user equipment. For example, a cable headend may remove blacked out content from a transmission stream or cable signal so that this content cannot be viewed or accessed on the user equipment. This is undesirable for locally-generated mosaics because the user equipment may generate the mosaic screen with one or more missing cells (e.g., cells displaying no content).

U.S. patent application Ser. No. 11/510,363, filed Aug. 24, 2006, which is hereby incorporated by reference herein in its entirety, describes one approach for blacking out individual cells of a video mosaic page. Although this system may replace one or more blacked out cells with replacement media content similar to the blacked out content, it would be desirable to also allow a user to subsequently access blacked out content should the blackout condition be lifted.

It would also be desirable to provide more flexible blackout support for all types of video mosaic screens, both locally-generated and remotely-generated. For example, it would be desirable to provide summary information about the blacked out content or content similar to the blacked out content to the user during the programming blackout.

SUMMARY OF THE INVENTION

In accordance with the principles of the present invention, a video mosaic client is implemented on a user's equipment. The video mosaic client supports the individual control of objects and screen elements in a video mosaic display.

In response to receiving a request for a video mosaic page, the video mosaic client may receive and process blackout information in screen data associated with the video mosaic page, if screen data is available for the mosaic page. The screen data may be sent in-band along with one or more video streams or out-of-band. After the screen data is parsed, the video mosaic client may analyze the received blackout information and determine if any objects in the video mosaic page are, or should be, blacked out.

If screen data is not available for the requested video mosaic page (e.g., the mosaic page is not remotely-generated), the video mosaic client may identify the content of each cell through media guidance application data or metadata tags associated with each mosaic cell. The application data or metadata tags may identify the source (e.g., by source or channel identifier), title, or any other suitable attribute of the content that is to be displayed in the mosaic cell. If screen data is available for some of the cells of the mosaic page and not others, a hybrid approach may be used whereby the mosaic client analyzes screen data for the cells with associated screen data and application data or metadata tags for the cells without associated screen data.

As described in more detail in U.S. patent application Ser. No. 11/510,363, the screen data may define one or more blackout flags. From the blackout flags, the video mosaic client may determine which cells in the mosaic page should be blacked out. Since the screen data may be time-synchronized (e.g., a real-time data stream), the video mosaic client may parse blackout flag structures as new flags are received. When the blackout condition is lifted, the previously blacked out content may then be displayed.

The video mosaic client may also access a set of blackout rules to determine if any of the cells in the mosaic display should be blacked out. In some embodiments, the mosaic client uses blackout rules when screen data is not available for a cell in the mosaic page. For example, locally-generated mosaics may not have associated screen data. As described in more detail in U.S. patent application Ser. No. 11/647,787, filed Dec. 28, 2006, which is hereby incorporated by reference herein in its entirety, video mosaic pages may combine local content (e.g., content recorded to a local storage device or DVR) with broadcast, multicast, switched digital video, and on-demand assets in a single mosaic display. In such cases, the mosaic client may identify the individual mosaic elements through metadata, application data, screen data, or any combination of the aforementioned types of data.

The mosaic client may then access a set of blackout rules. The blackout rules may be stored on the local user equipment and updated periodically from a network location. Alternatively, the blackout rules may be accessed from a third-party server whenever a mosaic screen is accessed. After the cells of the mosaic page are identified, the mosaic client may compare identifying information related to the mosaic cells to the blackout rules to determine if any content in the mosaic screen should be blacked out. Blackout rules may be time-based, location-based, or both time-based and location-based.

For example, the blackout rules may contain locality information, such as blackout zip codes, cities, states, geographic coordinates, or any other suitable information from which a location may be derived. This information may be compared to locality information present on the user equipment to determine if the content should be blacked out. For example, a local variable could be defined on the user equipment that identifies the current location of the user equipment. As the user equipment changes location, the local variable may be automatically updated by the video mosaic client to reflect the change in location.

If the video mosaic client determines that an element in a video mosaic page is, or should be, blacked out, the video mosaic client may mask the location of the blacked out object in the mosaic page and record the content for playback after the blackout condition is lifted. If the content is already available from a remote location (e.g., from an on-demand service or network media server), the mosaic client may not record the content locally, but rather store a pointer to the remotely stored content. After the mosaic client determines that the blackout is lifted (e.g., through the screen data or blackout rules), the mosaic client may display a notification to the user of the blackout expiration and/or the availability of recorded, previously blacked out content. The user may then access the previously blacked out content.

If the blacked out content is not actually transmitted to the user equipment (e.g., the content is blacked out and removed from the transmission at a cable headend), the video mosaic client may automatically send a request to a remote video server to deliver the blacked out content when the blackout has terminated. Alternatively, the request to deliver the blacked out content may be sent prior to the conclusion of the blackout, or the request may be timed so that the blacked out content will be available locally for viewing as soon as the blackout condition is lifted. Access restrictions may be enforced on the blacked out content until the blackout expires. In some embodiments, the blacked out content may not be recorded locally, but accessed via an on-demand service after the blackout condition has expired.

In some embodiments, the mosaic client may additionally or alternatively provide summary information, such as a sports ticker, relating to the blacked out content in the location of a blacked out cell. In some embodiments, the summary information is provided within the screen data for the blacked out cell. Since the screen data may be continuously refreshed, the summary information may provide, for example, up-to-date score, highlight, and/or play information relating to the blacked out content. Alternatively, after determining that a video cell in a mosaic page is blacked out, the mosaic client may access a supplemental data feed (e.g., XML feed) and present this feed in the location of the blacked out cell. The network address of the supplemental field may be stored in screen data, a metadata tag, or application data associated with the mosaic display. Accessing a supplemental data feed may be advantageous when screen data is not available for a given mosaic cell, or when the summary information requires a large amount of bandwidth (or will not fit within the screen data or blackout flag fields).

The summary information may be related to the blacked out content or the genre of the blacked out content. For example, a sports ticker with current score information of the blacked out event may be displayed in the blacked out cell. Alternatively, a sports ticker may be displayed showing all the scores of all games within the same sport, league, or tournament as the blacked out content. The sports ticker may flash or scroll scores from different games at a predetermined rate (e.g., 5 seconds), or the user may select the ticker speed. In some embodiments, the ticker is interactive and the user controls the display by pressing arrow keys on a remote control. In addition to displaying sports information, the summary information may include news and/or sports headlines, stock quotes, Really Simple Syndication (RSS) feeds, or any other information accessed from a suitable content or data source.

In response to the user selection of a blacked out video cell, a user may be presented with an overlay or menu of blackout options. These options may include replacing the blacked out object with replacement content, searching for content similar to the blacked out content that is accessible by the user equipment, or obtaining more information about the blacked out content, for example, through the summary information described above. Another option that may be presented to the user in the overlay or menu of blackout options is to record the blacked out content to a local recording device, such as a digital video recorder, or a remote location, such as an on-demand server, and allow playback of the blacked out content after the blackout conditions have expired.

For example, a venue protection blackout may prohibit the telecast of a live sporting event within a certain number of miles from the sporting venue. The blackout may expire at the conclusion of the event or after a predetermined length of time (the blackout window). By recording the blacked out event locally to the user's equipment or to a remote location, the user may access the blacked out content as soon as the blackout expires. In some embodiments, an icon or other notification is presented to the user when a blackout expires and there is recorded content available. A remote notification, such as a wireless message, page, SMS message, or telephone call may also be transmitted to a user who is remote from the user equipment, informing the user of the expiration of the blackout and/or the availability of recorded content. The user may then access the previously blacked out content from a mobile user equipment device, such as a PDA, mobile computer, or cellular telephone.

Some programming blackouts may only prohibit the live transmission of blacked out content, such as the live transmission of a sporting event. Depending on the details of the blackout, in some embodiments, blacked out content may be time-shifted (i.e., delayed) by a suitable length of time (e.g., 5 minutes). After the time shifting, the content may then be presented in its cell with the other video assets in the video mosaic page. In some embodiments, the time shifting process may create a buffer on the user equipment that buffers the blacked out content for a suitable length of time. Access to the blacked out content before the time-shifting process is complete may be restricted until the time-shifting is in compliance with the terms of the blackout. Other blackouts may specify a blackout window (e.g., the length of the game). For these types of blackouts, access controls may be enforced so that the user may not access the content during the blackout window. After the blackout window expires, the user may access the previously blacked out content.

In some embodiments, the aforementioned summary information (e.g., a sports ticker) may be provided for blacked out programming that is displayed in screens other than mosaic screens. For example, a sports ticker with detailed game summary information may be displayed when a user attempts to access a blacked out sporting event that is available on a television channel. The summary information may be displayed in full-screen along with real-time play-by-play text or audio commentary, if such content is not in violation of the blackout.

BRIEF DESCRIPTION OF THE DRAWINGS

The above and other features of the present invention, its nature and various advantages will be more apparent upon consideration of the following detailed description, taken in conjunction with the accompanying drawings, in which.

DETAILED DESCRIPTION

The systems and methods described herein are directed toward providing enhanced blackout functionality in video mosaic screens. Although the described embodiments may refer to Video-Rich Navigation (VRN) screens, displays, and/or pages, the present invention may be used with any remotely-generated or locally-generated video mosaic screens. In addition, although the windows or cells of the mosaic pages are described herein as being populated with analog or digital video from broadcast television channels, the windows or cells of the mosaic pages may be populated with any suitable video assets or media content. These video assets may include live broadcast programs, video on-demand (VOD) assets, pay-per-view (PPV) assets, recorded assets (e.g., from a digital video recorder, or DVR), locally stored assets, advertising, websites, previews, Webcasts, interactive games and applications, or any other suitable content. The cells may contain full-motion video, audio, still images, text, icons, logos, or any combination of these (or any other suitable) elements.

Figure 1A:
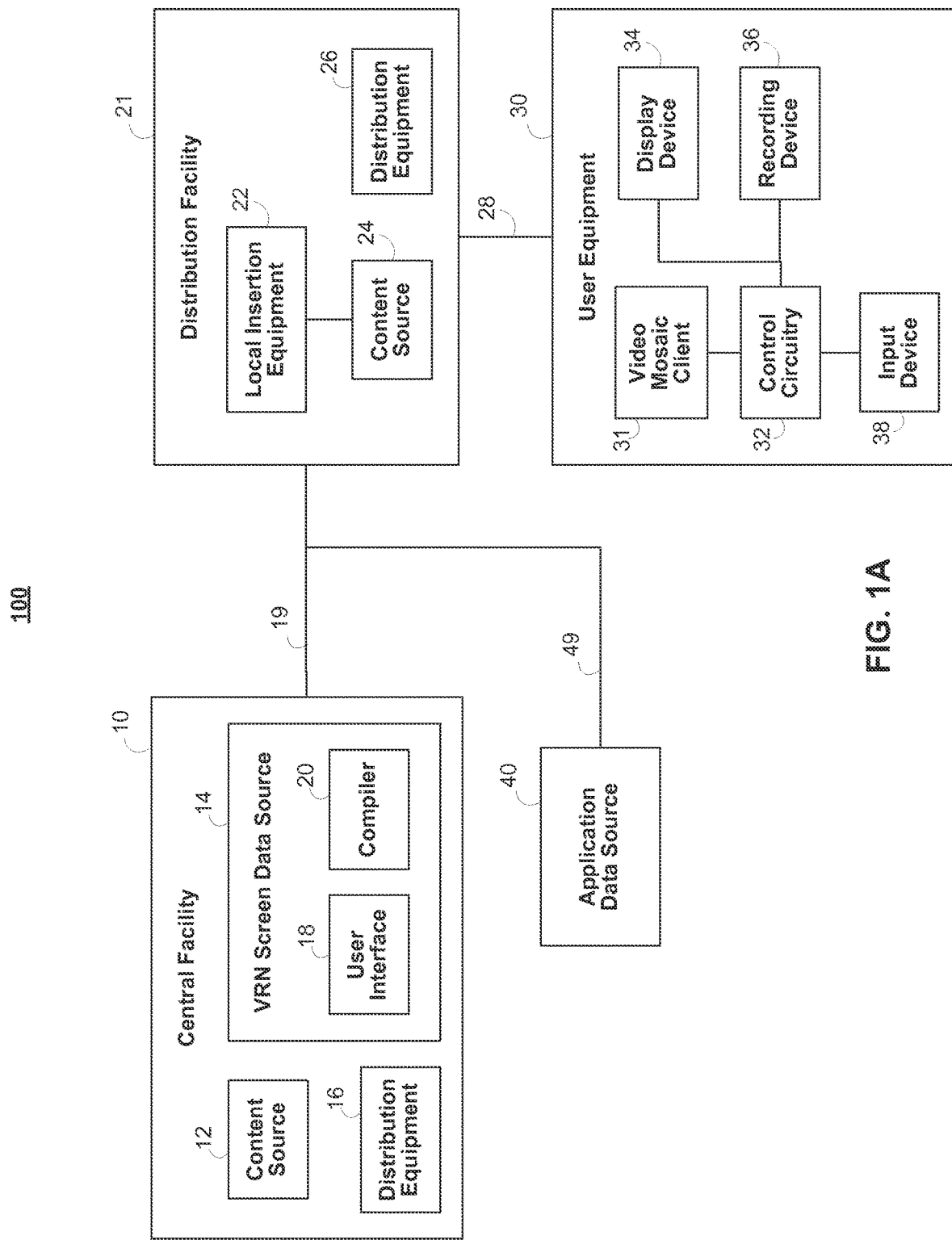
FIG. 1A is a diagram of an illustrative interactive media system in accordance with one embodiment of the invention.

FIG. 1A shows illustrative media system 100 for providing blackout support in a VRN environment in accordance with one embodiment of the invention. Central facility 10 may include content source 12, VRN screen data source 14, and distribution equipment 16. Content source 12 may include any equipment suitable for producing or generating VRN screens. The video content from content source 12 may be in analog or digital form. In other embodiments, content source 12 may be in a facility other than central facility 10, and may also provide content for distribution as regular television channels (e.g., broadcast programming, VOD content, etc.).

VRN screen data source 14 may be any equipment suitable for generating VRN screen data. For example, VRN screen data source 14 may be a personal-computer (PC) based system or a workstation. User interface 18 may be any suitable interface, such as a Windows-based or Unix-based graphic user interface (GUI), which allows, for example, an operator to define VRN definitional files and synchronize the VRN screen data of the definitional files with content from content source 12. The user interface may allow an operator to, for example, specify transitions between distinct configuration specifications for selectable items in synchronization with video content. The user interface may also allow an operator to define control data which controls, inter alia, the appearance, functionality, and interactivity of the screen elements, as well as the content or asset displayed in a screen element.

The screen data may also include blackout information. The blackout information may be inserted into the screen data by central facility 10 (e.g., the blackout information may be generated by VRN screen data source 14) or distribution facility 21. The blackout information may be entered by an operator, may be generated automatically from another system (such as an access-and-control system), or may be generated in any other suitable manner or combination thereof. The blackout information may include, for example, one or more blackout source identifiers, blackout multicast addresses (MCAs), blackout controller identifiers, channel map identifiers, cable plant identifiers, or any other suitable information. As described in more detail in U.S. patent application Ser. No. 11/510,363, the screen data may define one or more blackout flag structures for use in determining what mosaic screen elements should be blacked out on user equipment 30. The blackout information may also include locality information, such as a set of zip codes where the object associated with the screen data should not be presented. Compiler 20, which may include any suitable combination of hardware and software, compiles or translates the VRN screen data of the definitional files into another format, such as binary, XML, or HTML format. In some embodiments, input from user interface 18 may be used to directly generate the screen data without need for compiler 20.

Blackout information may also include blackout time definitions. These definitions may specify, for example, that a particular blackout is in effect between 3:00 PM EDT and 6:00 PM EDT. As another example, a blackout may be linked to a specific event in a television program guide database, with its activation time equal to the start time of the event and its deactivation time equal to the end time of the event. In some embodiments, the blackout time definitions may be included with the VRN screen data. In other embodiments, the blackout time definitions may be used to determine when to include blackout information in the VRN screen data.

Distribution equipment 16 may be any suitable equipment for distributing VRN screens from content source 12 and VRN screen data from VRN screen data source 14 over communications path 19 to distribution facility 21, and further over communication path 28 for distribution to user equipment 30. Central facility 10 may distribute the screens and screen data to multiple distribution facilities 20, but only one has been shown to avoid over-complicating the drawing. In other embodiments, central facility 10 may distribute the VRN screens and screen data to users at user equipment 30 directly. Distribution equipment 16 may distribute the VRN screens and VRN screen data in any suitable analog or digital format and over any suitable communications path (e.g., satellite or terrestrial broadcast, the Internet, etc.). VRN screen data and blackout information may be distributed in-band or out-of-band from the VRN screens.

Distribution facility 21 may be any facility (e.g., a cable headend) suitable for receiving the VRN screens and screen data and distributing the screens and screen data to user equipment 30. There may be multiple users at multiple instances of user equipment 30, but only one instance of user equipment has been shown to avoid over-complicating the drawing. Distribution facility 21 may include local insertion equipment 22 and content source 24 for allowing a local operator to insert content and data into the VRN screens or VRN screen data, respectively, and compile VRN screen data into binary format for transmission (if required). Local insertion equipment 22 may run, for example, a local version of user interface 18 and compiler 20.

Distribution facility 21 may also access summary content information and data feeds, such as real-time sports information feeds, sports highlights video, and any other summary information. This summary information may be accessed from central facility 10 or a third-party content provider or content aggregator. Summary information may also be accessed via the Internet (e.g., through a Really Simple Syndication (RSS) or other web-based feed or stream) in some embodiments. The summary information may be inserted into the screen data by a local operator using local insertion equipment 22, or the summary information may be automatically inserted into the screen data at central facility 10. For example, summary information relating to a sporting event may be added to the screen data and associated with the mosaic cell displaying that sporting event. In the event that the cell is blacked out on the user equipment, the video mosaic client may substitute the summary information for the sporting event in the cell, as described in more detail below. In some embodiments, the summary information may be sent separately from the VRN screen data. Distribution facility 21 may also include a remote recording server for recording blacked out programs and making them available at a later time to user equipment 30. This remote recording server may include tuning equipment for accessing the programming, memory (such as a hard disk) for storing the programming, and video-on-demand server equipment for making the programming available to user equipment 30. Remote recording equipment may also be included other locations in the system, such as at central facility 10.

Distribution equipment 26 may distribute the VRN screens and VRN screen data in any suitable analog or digital format and over any suitable communications path to user equipment 30 (e.g., broadcast, cable, or the Internet. The communication paths 19, 49, and 28 may include, for example, a satellite path, a fiber-optic path, a cable path, an Internet path, or any other suitable wired or wireless path. For example, VRN screens may be provided as MPEG-2 feeds. Distribution equipment 26 may provide the VRN screens (and the VRN screen data) as tunable analog or digital channels, or as VOD streams (both of which are referred to herein as VRN channels). The VRN channels provide the users of user equipment 30 with a set of interactive features that make up a VRN application.

In some embodiments, distribution facility 21 may provide the VRN channel full-time over a given analog or digital channel. Alternatively, distribution facility 21 may provide VRN channels on-demand or during specific time intervals.

Distribution facility 21 may provide one or more VRN applications to user equipment 30. A VRN application may include a set of VRN screens, buttons, and associated functionality. For example, FIG. 4, described in more detail below, shows a homepage display screen associated with an illustrative VRN application.

User equipment 30 may include any equipment suitable for providing an interactive media experience and for implementing the VRN applications provided by distribution facility 21. User equipment 30 may include television equipment such as a television, set-top box, recording device, video player, user input device (e.g., remote control, keyboard, mouse, touch pad, touch screen, or voice recognition interface), or any other device suitable for providing an interactive multimedia experience. For example, user equipment 30 may include a DCT 2000, 2500, 5100, 6208 or 6412 set-top box provided by Motorola, Inc. In some embodiments, user equipment 30 may include computer equipment, such as a personal computer with a television card (PCTV). In some embodiments, user equipment 30 may include a gaming system, a portable electronic device, such as a portable DVD player, a portable gaming device, a cellular telephone, a PDA, a music player (e.g., MP3 player), or any other suitable portable or fixed device.

In the example of FIG. 1A, user equipment 30 includes at least control circuitry 32, display device 34, recording device 36, user input device 38, and video mosaic client 31, which may be implemented as separate devices or as a single device. Video mosaic client 31 may also be implemented on user equipment 30 to receive, execute, and support VRN applications.

Control circuitry 32 is adapted to receive user input from input device 38 and execute the instructions of video mosaic client 31 and any other interactive applications running on user equipment 30. Control circuitry 32 may include one or more tuners (e.g., analog or digital tuners), decoders (e.g., MPEG decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 30, and any other suitable component for providing analog or digital media programming and interactive media features. In one embodiment, control circuitry 32 may be included as part of one of the devices of user equipment 30 such as, for example, part of recording device 36, display device 34, or any other suitable device (e.g., a set-top box, television, video player, etc.).

Display device 34 may include any suitable device such as, for example, a television monitor, an LCD screen, a computer monitor, or a display incorporated in user equipment 30 (e.g., a cellular telephone display or music player display). Display device 34 may also be configured to provide for the output of audio and/or other sensory output (e.g., a holographic projector or virtual reality simulator).

Recording device 36 may be a personal video recorder (PVR), digital video recorder (DVR), video cassette recorder (VCR), DVD-recorder, or any other suitable recording device. Recording device 36 may include one or more tuners.

Video mosaic client 31 may be implemented on user equipment 30 as a stand alone applications or part of another interactive application, such as an interactive media guidance application (IMGA) or interactive program guide (IPG). One or more of the interactive applications may receive interactive application data from application data source 40. As shown in FIG. 1A, the data may be received via distribution facility 21 over communication path 49. Alternatively, the data may be received by user equipment 30 from application data source 40 over a direct communication path (not shown). Application data source 40 may also be part of central facility 10 or distribution facility 21. In some embodiments, the interactive application data may include elements that are referenced in the VRN screen data for inclusion in the VRN application such as graphics, logos, advertising, and the like. VRN templates, for example, may be provided as part of the interactive television application data.

Homepages (and other VRN screens or pages) delivered to user equipment 30 may include a number of interactive elements. Interactive elements may be highlighted and selected. If the user navigates to a specific interactive element (e.g., by using the arrow keys on a remote control device), the interactive element may be visually highlighted in some fashion (e.g., a colored border may appear around the element). If the user selects a highlighted interactive element (e.g., by pressing the "OK" button on a remote control device), the system may display a specific tunable channel, VOD clip, VOD screen, or another interactive application screen, based on selection behavior specified for the interactive element in the VRN screen data.

Video mosaic client 31 provides enhanced blackout functionality for VRN screens and pages. For example, video mosaic client 31 may parse received VRN screen data to determine if one or more objects in a VRN or video mosaic screen should be blacked out. In some embodiments, the blackout information in the screen data simply specifies the object or objects in the video mosaic page that should be blacked out on the user equipment. In these embodiments, each user equipment may receive different blackout information, depending on such factors as the user equipment's locality, channel map, or any other suitable information. Video mosaic client 31 may determine the location of the blacked out object within the video mosaic page and take appropriate action to blackout the object. In other embodiments, the same blackout information is delivered to all users requesting the same video mosaic page in the form of one or more blackout flag structures. Video mosaic client 31 parses the received blackout flag structures to determine if any objects in the video mosaic page should be blacked out.

When mosaic client 31 determines that a cell or screen element should be blacked out on the user equipment, for example, from the screen data or set of blackout rules, mosaic client 31 may perform one or more actions, depending on user and system preferences. For remotely-generated mosaics, mosaic client 31 may mask the content that should be blacked out and replace it with summary content, such as a sports ticker. It may also record the content locally so that the blacked out content may be accessed and displayed after the blackout condition has been lifted. In some embodiments, a notification, such as the notification shown in FIG. 10, may also be displayed to the user when the mosaic client determines that the blackout has expired and there is previously blacked out content available for viewing.

As described above, summary information, such as data for the sports ticker shown in FIG. 9, below, may be inserted into the screen data in some embodiments or otherwise provided to video mosaic client 31. The summary information may be inserted into the screen data as alternate content for the mosaic cell. Some cells may have multiple alternate content selections defined in the screen data. For example, one alternate content selection may be a sports ticker for the blacked out game, one may be commentary video, and another may be a sport highlights video.

In lieu of, or in addition to, providing the summary or alternate content in the screen data, in some embodiments, a link to the information may be provided in the screen data to save bandwidth. For example, the URL or network address for one or more supplemental data feeds (e.g., RSS feeds) may be included in the screen data and associated with a mosaic cell. After mosaic client 31 determines that a cell is to be blacked out, mosaic client 31 may process the screen data and access the supplemental feed or feeds referenced by the screen data. Mosaic client 31 may then mask the blacked out cells and display the feeds in the position of the masked cells.

In the case of locally-generated mosaics (or partially locally-generated mosaics), there may not be screen data available for the mosaic page (or the entire mosaic page). If screen data is not available, mosaic client 31 may access summary or alternate content within application data delivered to user equipment 30 with the mosaic screen or page. The application data may take the place of the screen data described above. The information itself may be inserted in to the application data, or a link to the information may be inserted.

Figure 8:
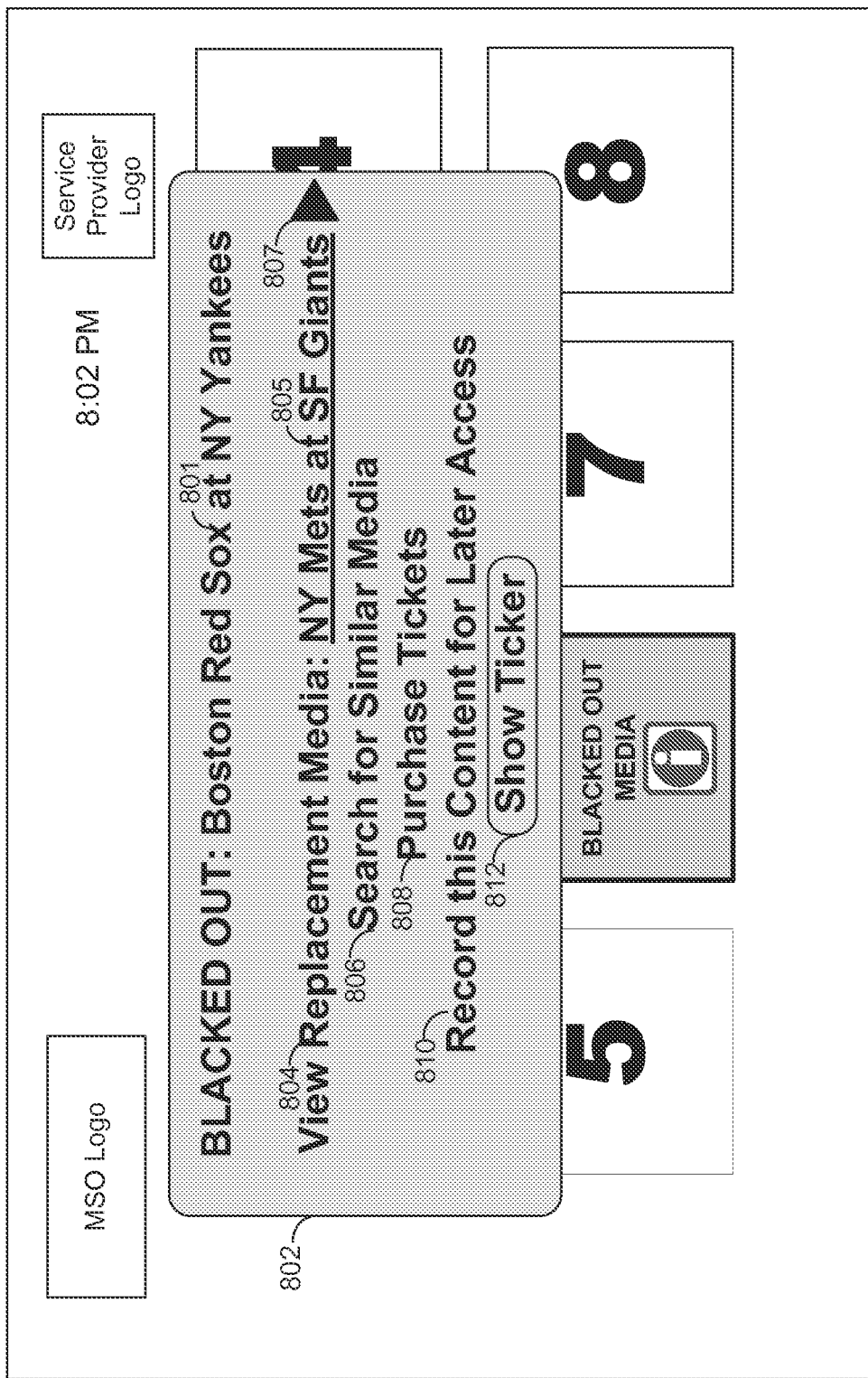
FIG. 8 is an illustrative display screen showing a blacked out overlay with options for a blacked out video cell in accordance with one embodiment of the present invention.

In some embodiments, blacked out cells (even those replaced with alternate or summary content) are not selectable by the user. For example, video mosaic client 31 may prevent user selection of blacked out cells by moving the selection cursor to the next cell that is not blacked out. In other embodiments, users may select blacked out cells. Upon selecting a blacked out cell, video mosaic client 31 may display various blackout options to the user. These options may allow a user to substitute replacement media in a blacked out cell or window, search for accessible media similar to the blacked out media, purchase tickets, obtain more information, record the blacked out content for later playback, or any other suitable action. FIG. 8, described below, shows illustrative blackout options in accordance with one embodiment of the invention.

Although, in the illustrated embodiment of FIG. 1A, video mosaic client 31 is internal to user equipment 30, video mosaic client 31 may be implemented externally or partially implemented externally to user equipment 30. For example, video mosaic client 31 may be implemented at central facility 10 or distribution facility 21 and may run using a client-server or distributed architecture where some of the application is implemented locally on user equipment 30 in the form of a client process and some of the application is implemented at a remote location in the form of a server process. Video mosaic client 31 may also be implemented completely on any suitable server, computer equipment, or set-top box accessible by user equipment 30.

Figure 1B:
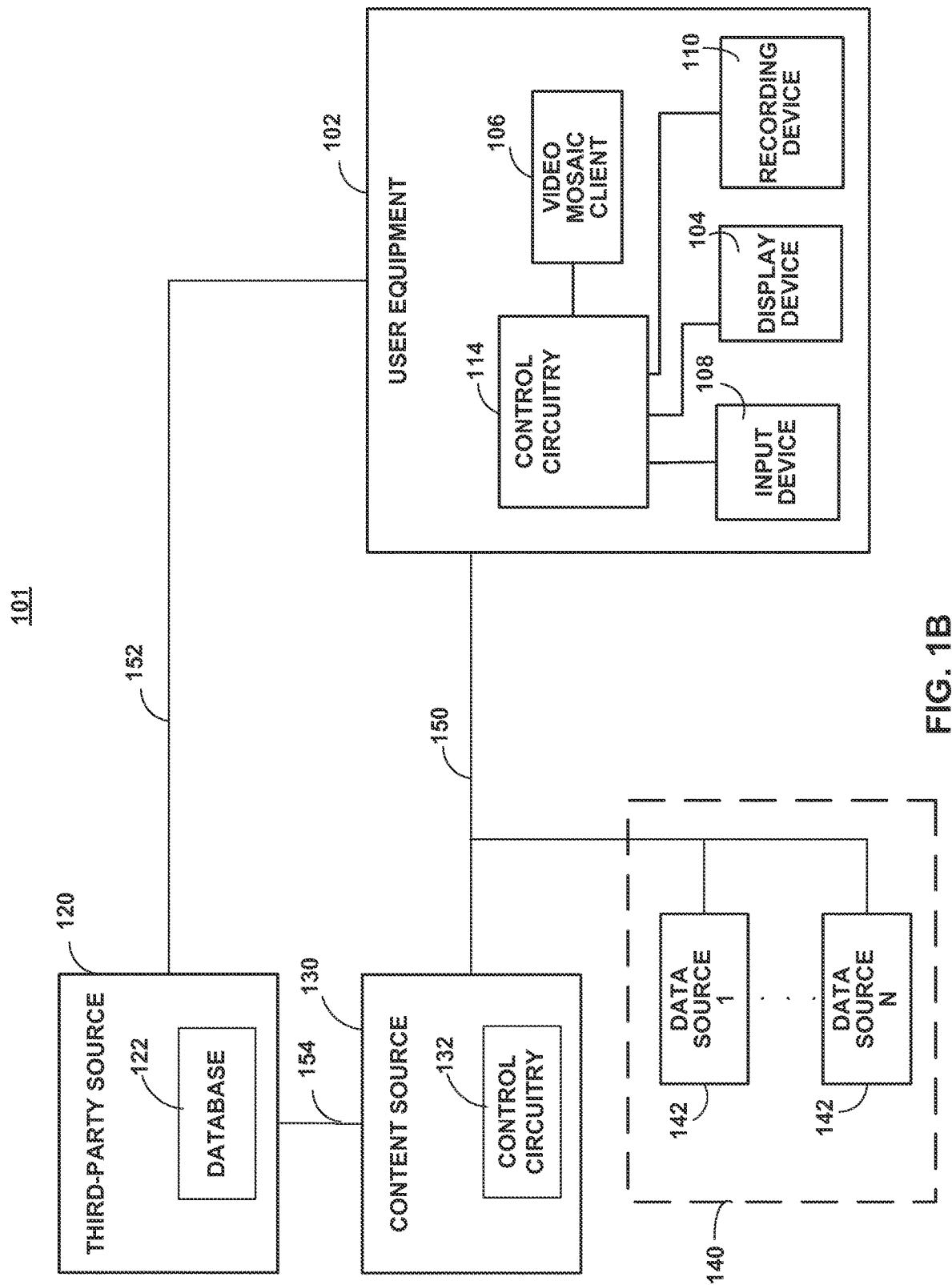
FIG. 1B is a diagram of another illustrative interactive media system in accordance with one embodiment of the invention.

FIG. 1B shows illustrative interactive media system 101 in accordance with one embodiment of the invention. Interactive media system 101 may be used to generate and display locally-generated mosaic screens, in some embodiments, while media system 100 (FIG. 1A) may be used to generate and display remotely-generated mosaics. Although sometimes reference will be made herein specifically to components of media system 100 (FIG. 1A) or media system 101 (FIG. 1B), in most cases either media system (or a combination or both media systems) may be used. For example, the components and features of user equipment 30 (FIG. 1A) may be exchanged with the components and features of user equipment 102. As another example, media system 100 (FIG. 1A) may also incorporate one or more of data sources 142, content source 130, and third-party source 120 without departing from the spirit of the invention.

User equipment 102 receives content in the form of signals from content source 130 and/or third-party source 120 over communications paths 150 and 152. Any suitable number of users may have user equipment, such as user equipment 102, coupled to content source 130, data sources 140, and third-party source 120. For the clarity of the figure, however, the user equipment of only a single user is shown. In addition, although in practice there may be numerous instances of content sources and third-party sources, for clarity only content source 130 and third-party source 120 are shown in FIG. 1.

Content source 130 may be any suitable content source such as, for example, a cable system headend, satellite television distribution facility, television broadcast facility, on-demand server (e.g., video-on-demand ("VOD") server). Internet or network media/web server, or any other suitable facility or system for originating or distributing passive or interactive media content to user equipment 102. Media content that may be provided by content source 130 to user equipment 102 includes broadcast programs, broadcast series, VOD programs, music, news, interactive applications (e.g., interactive games), Internet resources and web services (e.g., websites, newsgroups, and chat rooms), and any other media content capable of being displayed by, presented to, recorded, or interacted with, using user equipment 102.

Third-party source 120 may be any suitable data source configured to provide mosaic screen data and interactive applications to content source 130 or directly to user equipment 120 via communications paths 154 and 152, respectively. Third-party source 120 may include any third-party application provider, data manager, content manager, content aggregator, or intermediate content provider. Third-party source 120 may also be contracted to provide enhanced blackout support on behalf of user equipment 102. For example, third-party source 120 may be connected to the Internet or other communications network via a network interface (not shown) for communication with external users and systems. Third-party source 120 may access remote data feeds and summary information relating to programs and services accessible via media system 101. Third-party source 120 may also access remote data feeds and summary information relating to programs and services not accessible via media system 101. For example, third-party source 120 may access sports ticker data related to all sporting events, regardless of whether the sporting event is televised. Third-party source 120 may include database 122 for storing such feeds and summary information. Although database 122 is shown internal to third-party source 120, database 122 may be any storage device accessible by third-party source 120 and may be external to third-party source 120.

Database 122 may also store the video mosaic client application itself. Upon receiving a request from user equipment 102, third-party source 120 may transmit the video mosaic client application directly to user equipment 102 via communications path 152 (or third-party source 120 may transmit the video mosaic client application to content source 130 for transmission to user equipment 120, if desired). In one embodiment, either or both of the video mosaic client application and an associated interactive media guidance application are Open able Applications Platform ("OCAP") applications downloaded by middleware to user equipment 102. User equipment 102 (or a proxy acting on behalf of the user equipment) may periodically query third-party source 120 for application updates, various third-party content and data feeds, or any other media content information.

Content source 130 and third-party source 120 may be configured to transmit signals to user equipment 102 over any suitable communications paths 150 and 152 including, for example, a satellite path, a fiber-optic path, a cable path, or any other suitable wired or wireless path. The signals may be transmitted as a broadcast, multicast, unicast, or any other suitable transmission stream. Content source 130 may also include control circuitry 132 for performing operations on the signals transmitted by the content source such as, for example, generating new signals or communicating with user equipment 102 to provide on-demand content.

User equipment 102 may receive interactive media guidance application data from one or more instances of data sources 140, content source 130, and/or third-party source 120. Data sources 140 may provide data for a particular type of content or for a particular application running on user equipment 102. For example, one data source 142 may provide data for an interactive television program guide application and another data source may provide data and content for video mosaic client 106. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130, third-party source 120, and data sources 140 are shown in FIG. 1 as separate elements. In practice, their functionality may be combined into a single mechanism and provided from a single system at a single facility, or their functionality may be provided by multiple systems at multiple facilities. For example, content source 130 and data source 142 may be combined to provide broadcast television content and associated broadcast television data, including ratings information, program data, or other suitable information.

User equipment 102 may include any equipment suitable for providing an interactive media experience and may include all the components and features of user equipment 30 (FIG. 1A). For example, user equipment 102 may include computer equipment, such as a personal computer with a television card (PCTV). User equipment 102 may also include control circuitry 114 (e.g., a set-top box, processor, or hardware controller) to execute the instructions of video mosaic client 106, recording device 110, display device 104, user input device 108 (e.g., remote control, a keyboard, a mouse, a touch pad, a touch screen, and/or a voice recognition/verification module), and any other device suitable for providing a complete, interactive television experience.

Figure 2:
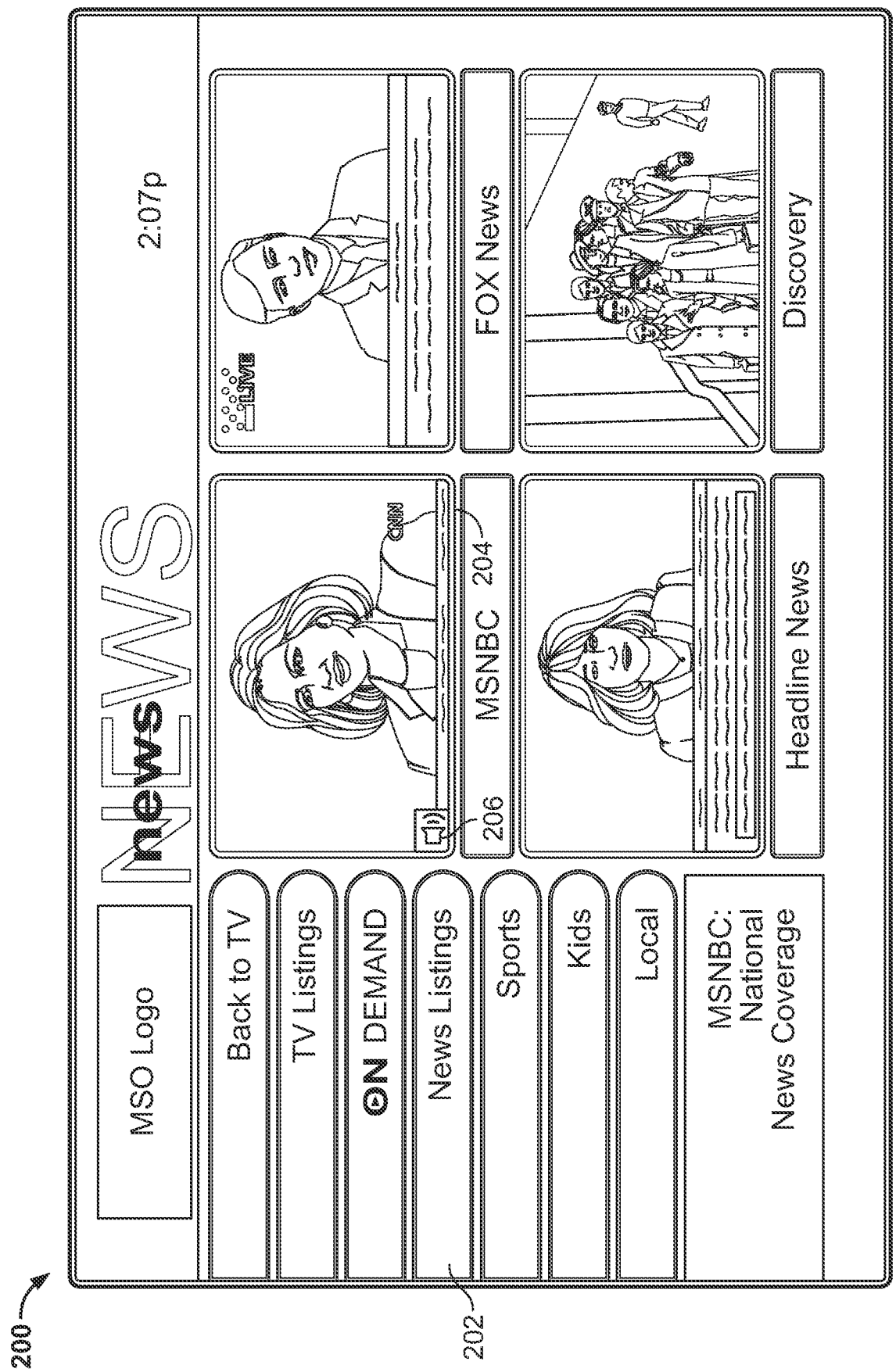
FIG. 2 is an illustrative display screen showing a video mosaic page in accordance with one embodiment of the invention.

FIG. 2 shows illustrative genre video mosaic display 200 in accordance with one embodiment of the invention. Display 200 contains four large video cells displaying four different news channels or programs in full-motion video. The user may be presented with a different genre video mosaic page by selecting the various buttons on the left side of display screen 200. For example, news genre display 200 may be presented upon selecting button 202. Similar video mosaic pages may be displayed for other genres, including sports and kids programming. As shown in the example of FIG. 2, cell 204 is currently selected. The audio associated with cell 204 is currently being played, as indicated by icon 206. The audio for the remaining, unselected cell windows may be muted until the user selects the individual cells.

Figure 3:
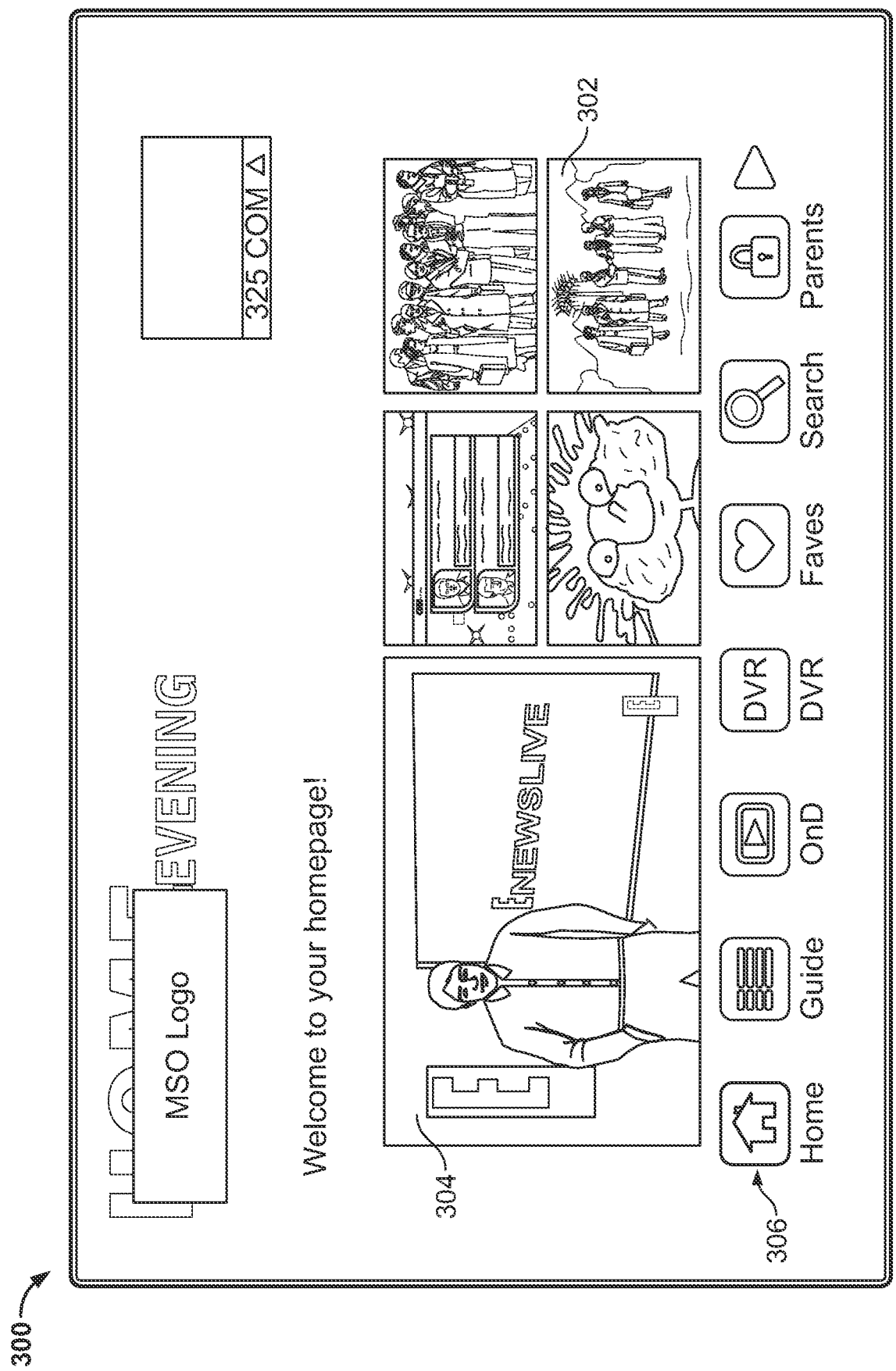
FIG. 3 is an illustrative display screen showing a video mosaic homepage with user navigation buttons in accordance with one embodiment of the invention.

FIG. 3 shows illustrative VRN homepage 300 in accordance with one embodiment of the invention. In some embodiments, homepage 300 is accessible through a particular digital television channel. A user may also be presented with homepage 300 after selecting an appropriate button on input device 38 (FIG. 1A). For example, a "Home Page" button may provide direct access to homepage 300. In some embodiments, homepage 300 may be optionally locked, requiring a valid parental control access code input in order to view the page. Homepage 300 may include main cell 304, one or more thumbnail cells 302, and option buttons 306. Main cell 304 and thumbnail cell 302 may both be VRN cells, capable of displaying full-motion video. In some embodiments, main cell 304 is approximately four times larger in size than thumbnail cell 302.

Figure 4:
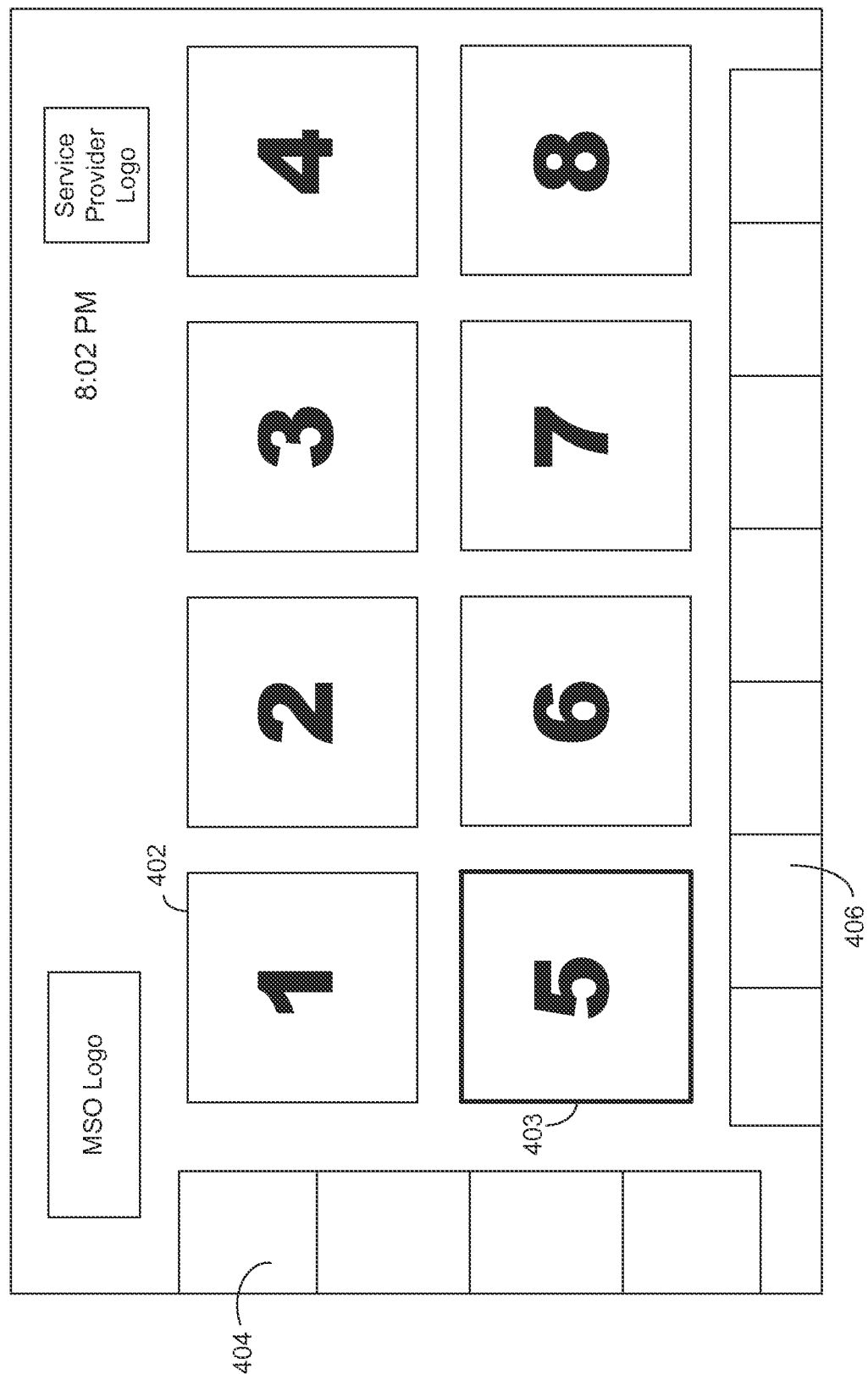
FIG. 4 is an illustrative generic display screen showing a number of video windows, or cells, in accordance with one embodiment of the invention.

Options buttons 306 may include single-selection access to a variety of commonly-used features. For example, options buttons 306 may link the user to the interactive media guidance application, on-demand or digital video recorder (DVR) resources, or permit the user to search for available media, FIG. 4 shows illustrative generic video mosaic display screen 400 in accordance with the invention. In the example of FIG. 4, screen 400 contains eight numbered cells, or windows. Each of these eight cells may be populated with a different asset or channel. For example, cell 402 may include full-motion video from channel 225 Cinemax while cell 403 may contain promotional advertising for new VOD movie releases. Each of the cells in display 400 may be individually selected using input device 38 (FIG. 1A). For example, the user may highlight a cell in display 400 using the arrow or cursor keys on a remote control. In the example of FIG. 4, cell 403 is currently highlighted, as shown by the darkened border around the cell. One or more cells may be simultaneously selected, if desired. For example, upon pressing an "OK" key on input device 38 (FIG. 1A), the selected status of a cell may toggle on and off. The user may then select one or more additional cells in the same manner.

The number, location, size, and shape of the cells in display 400 may be altered without departing from the spirit of the invention. As described above, screen data may be used to define the elements in a video mosaic page. This data may define more or fewer than eight cells and cells of different sizes, positions, and shapes than those shown in FIG. 4. In some embodiments, the properties of the cells in display 400 are customizable by the user. For example, video mosaic client 31 (FIG. 1A) may support variable-sized cells, and the user may drag a corner of a cell using input device 38 (FIG. 1A) to increase or decrease the size of the cell. Similarly, a user may reshape a cell in one or more dimensions by dragging a cell boundary other than a corner. The video mosaic client may also permit cell positions to be altered in real-time while video assets are playing. For example, a user may drag one or more cells to new locations or rearrange the placement of the cells to further customize the page.

VRN display screen 400 may also include one or more of vertical option buttons 404 and horizontal option buttons 406. These buttons may link screen 400 to other VRN screens, the main IMGA screen, or perform any suitable functionality. For example, one button may select all the numbered cells in screen 400, while another button may deselect all the numbered cells in screen 400.

Figure 5:
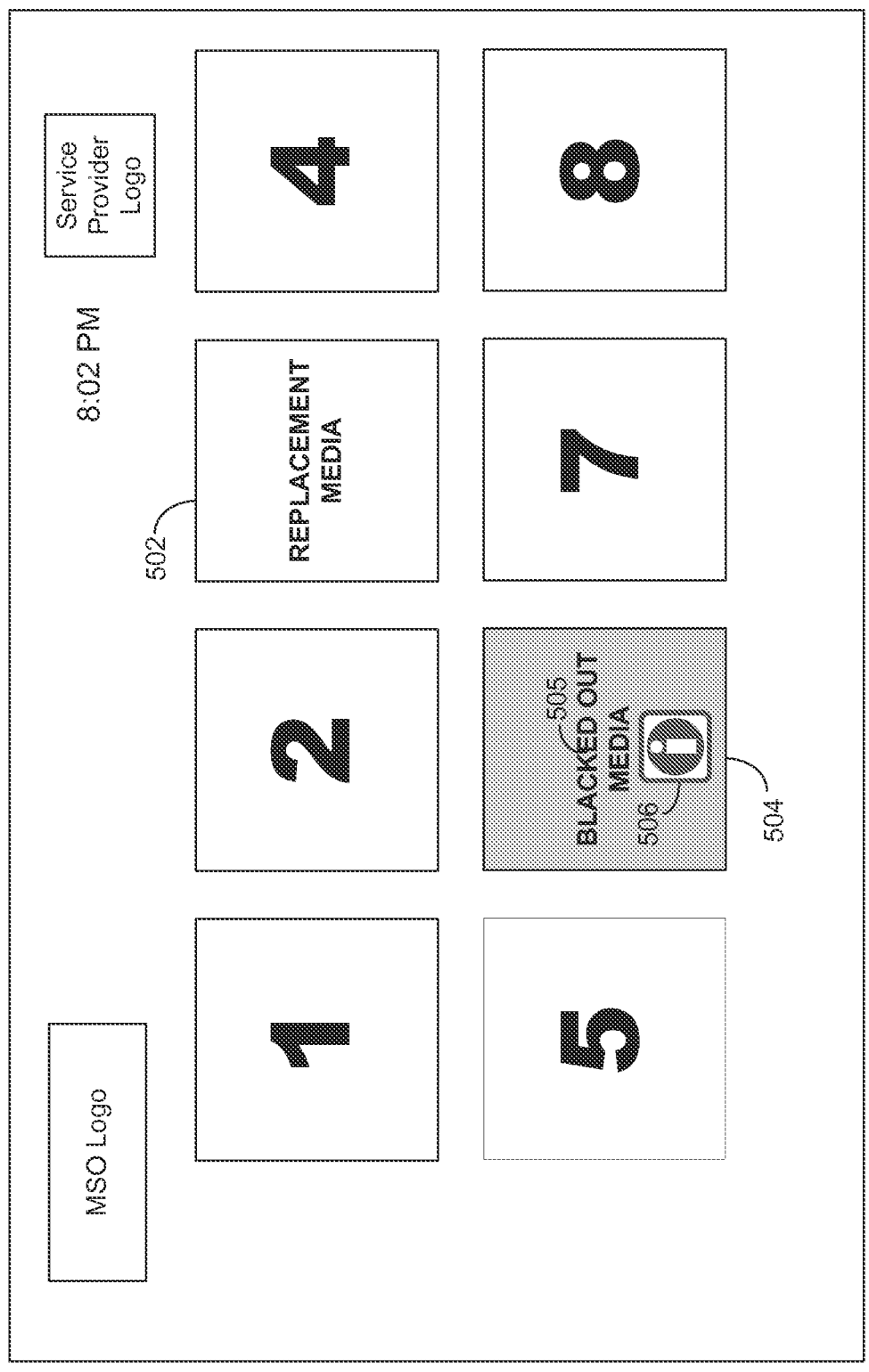
FIG. 5 is an illustrative display screen showing a blacked out masked cell and a blacked out cell showing replacement media in accordance with one embodiment of the invention.

FIG. 5 shows blacked out video windows in video mosaic page 500 in accordance with one embodiment of the invention. Before displaying each element in mosaic page 500, video mosaic client 31 (FIG. 1A) may process screen data received by distribution facility 21 (FIG. 1A) to determine if any video assets in display 500 should be blacked out. The screen data may include such information as the number of cells in a page, the location (e.g., the x and y coordinates) of each cell, the sizes and shapes of each cell, etc. When a user tunes to a broadcast channel or video service, such as a PPV or VOD service, the video mosaic client may first determine whether the channel or video stream includes screen data. This determination may be made automatically, or performed only when the channel or stream is identified as a remotely-generated mosaic channel or stream. If the channel or video stream does not have associated screen data, the video mosaic client may continue to monitor the channel or stream to detect such data if it subsequently becomes available. Once screen data becomes available, the data is parsed and the individual screen elements are identified.

In some embodiments, screen data may not be available for each cell in mosaic page 500. In such embodiments, application data may be used to identify the content of each cell not associated with screen data. The video mosaic client may then use this identifying information to look up blackout information from a network location or content source (e.g., content source 12 or 24, both of FIG. 1A). The blackout information may include a set of blackout rules, which may be cached locally to the user equipment in a database or other suitable local storage location. The blackout information looked up from the network location, content source, or database may include any suitable asset information needed to determine if the asset is currently blacked out by one or more programming blackouts.

In one embodiment, the blackout information associated with a content source defines blackout flag structures to define conditions under which the content should be blacked out. This may include, for example, one or more source identifiers (specifying that the content should be blacked out if the specified source is available to user equipment 30), one or more multicast addresses (MCAs) (specifying that the content should be blacked out if user equipment 30 is included in the multicast set), and/or one or more controller identifiers (specifying that the content should be blacked out if user equipment. 30 is controlled by the identified controller). From this information, video mosaic client 31 (FIG. 1A) may determine whether an element in a video mosaic screen should be blacked out. In order to prevent users from accessing video data without parsing or processing the associated screen data, various control mechanisms may be used. For example, the video mosaic pages may be converted to one or more hidden channels that are not accessible via normal user equipment operation. Only a VRN application (or another application that supports screen data processing) may be permitted to access the hidden channels. Alternatively or additionally, the screen data may be interleaved with the video stream so that the screen data must be decoded with the video data. The video content may be encrypted and the decryption key may be only made available to user equipment devices that include video mosaic client 31.

When the video mosaic client determines that one or more elements in a video mosaic page should be blacked out, in some embodiments, the mosaic client may mask, or gray out, those elements with a graphic, icon, text, or logo. For example, blacked out cell 504 is masked with a gray box and "Blacked Out" label 505. The location of the mask may be determined by the received screen data. For example, the screen data may define the x and y coordinates of each cell, the cell size, shape, and/or any other property of the cells in display 500. By selecting more information icon 506, the user may be linked to more information about the blackout, including the type of blackout, the duration of the blackout, details on the blacked out media, and any other suitable information.

The screen data or application data may also define control data for each cell. In some embodiments, to determine whether a cell should be blacked out, the video mosaic client may compare the received blackout information to local variables on the user equipment. For example, the control data itself may include a set of conditionals that, when interpreted by the user equipment, cause the video mosaic client to retrieve one or more user equipment variables (e.g., the user's zip code or channel line-up) and determine whether a blackout applies to the particular user equipment.

The control data (also referred to herein as action data) may also define actions associated with a user selection of a cell. For example, the control data may instruct the video mosaic client to link the user to a broadcast channel or to order a VOD or PPV asset upon the user selection of a cell. For blacked out cells, the cells associated control data may be redefined or supplemented by the video mosaic client so that one or more new actions are defined upon a user selection of a blacked out cell. For example, as shown in display screen (FIG. 8), the control data may instruct the video mosaic client to present a blackout option overlay after the user selection of a blacked out cell. The video mosaic client may also redefine or supplement the control data so that any other suitable action occurs upon the user selection of a blacked out cell.

For example, the video mosaic client may override a mosaic template definition by applying a new template to the video mosaic page. The new template definition may globally redefine the action data associated with each object in the video mosaic page that is determined to be blacked out on the user equipment. For example, the new template may overwrite the existing control data relating to each blacked out object in the video mosaic page and define a new series of prompts to be displayed upon user selection of a blacked out object.

In addition to masking the area of a blacked out cell in display screen 500, the video mosaic client may also block the audio associated with any blacked out cell. Blacked out elements in a video mosaic page may also be automatically replaced with substitute media. In some embodiments, the media substitution may be performed locally by the video mosaic client. In other embodiments, the substitution is performed at a local cable headend or other distribution facility, such as distribution facility 21 (FIG. 1A). If the substitution is performed before reaching the user equipment at a headend or distribution facility, the facility may utilize hardware, such as video encoding/decoding circuitry, to remove the blacked out video stream and substitute the stream with a replacement video stream. The video mosaic page may then be re-rendered or recreated, if required, and delivered to the user equipment. New screen data may also be added to the mosaic page by the distribution facility to reflect the new replacement content.

If the substitution is performed locally by the video mosaic client, locally-stored video, advertising, and graphics may be used as the replacement media and presented in the mosaic page. Additionally or alternatively, the video mosaic client may substitute any content currently accessible by the user equipment with the blacked out content. For example, broadcast programs, on-demand programs, PPV programs, or media recorded to a local storage device (e.g., recording device 36 of FIG. 1A) may be presented in a blacked out cell in lieu of blacked out content. For example, cell 502 may be a blacked out cell that contains full-motion replacement media.

The video mosaic client may also replace a blacked out cell in a video mosaic page with summary information. This summary information may be related or unrelated to the content blacked out in the cell. Summary information may include a sports ticker, as shown in FIG. 9, audio and video highlights of the blacked out content (e.g., sports highlights), commentary on the blacked out content, or any other suitable information about the blacked out content that does not violate the programming blackout. For example, some blackout rules may only prevent the live telecast of an event, such as a sporting event. Video highlights and audio-only or text-only streams may not violate the blackout, in which cases this information may be presented in the place of the blacked out cell as summary information.

Figure 6:
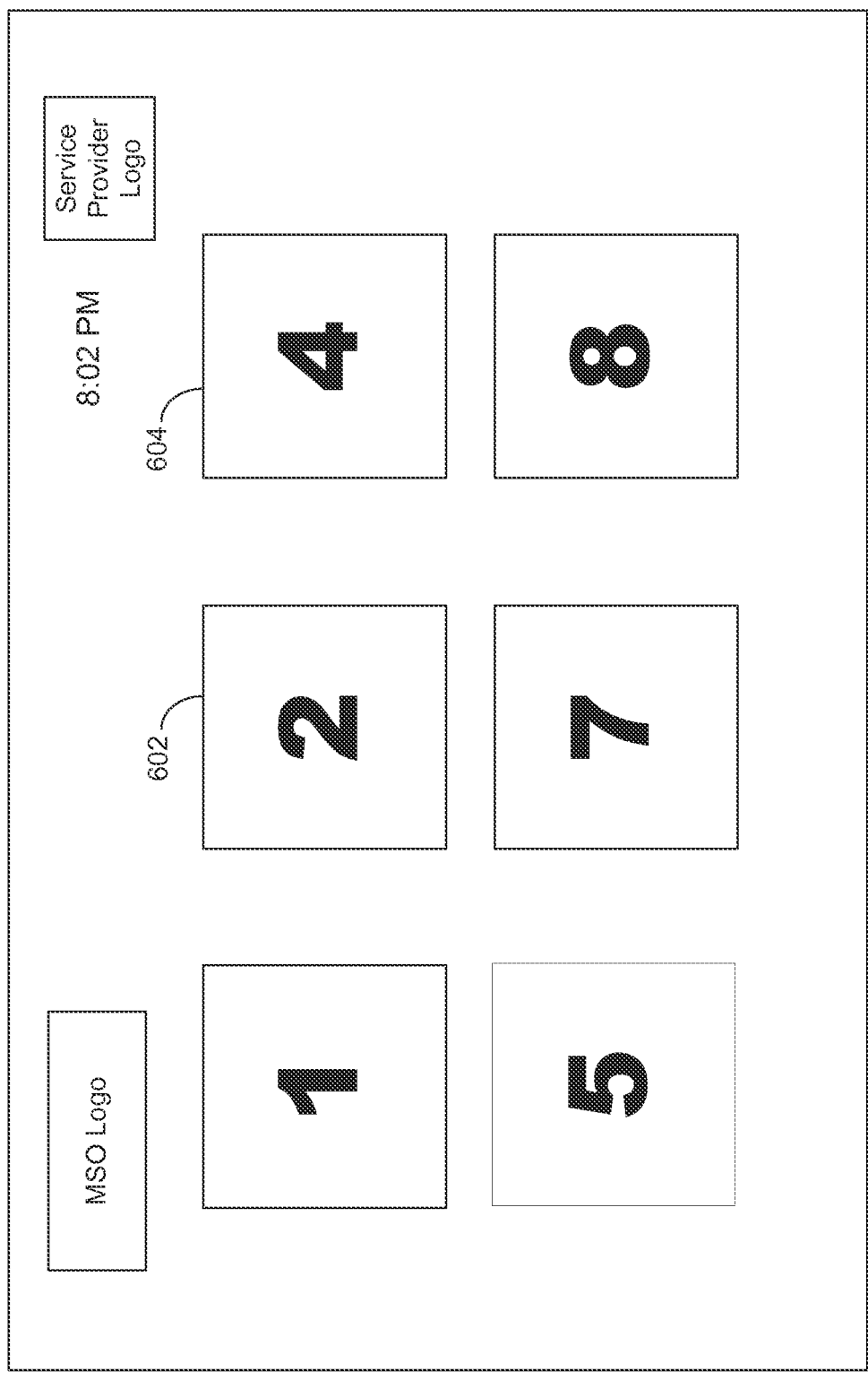
FIG. 6 is an illustrative display screen with the blacked out cells of FIG. 5 removed from the mosaic page in accordance with one embodiment of the present invention.

In some embodiments, blacked out elements in a video mosaic page are removed from the page before presentation of the page to the user. The video mosaic client may dynamically recreate or re-render the mosaic page without the blacked out elements, if desired. As shown in FIG. 6, this may create the appearance that the blacked out elements never existed. For example, blacked out cell 3 is removed from mosaic screen 600 and cells 602 and 604 are now positioned adjacent to one another. Blacked out cell 6 is similarly removed from the page. In addition to removing the blacked out elements, the video mosaic client may recreate the page so that the remaining cells are relocated or repositioned. For example, the remaining cells may appear centered in mosaic screen 600. In some embodiments, the cell size is also dynamically adjusted to compensate for the missing cells. For example if four out of eight cells are blacked out, the four locked cells may be removed from the display and the size of the remaining four cells may be increased by approximately 50%. In this way, a user may not be aware of blacked out elements that were dynamically removed in a mosaic page.

If blacked out cells are completely removed from the page, and the page is re-rendered with a change in position of the remaining cells, the video mosaic client may map incoming screen data and control data to the location of the new cells. Because the incoming screen data may incorrectly reflect the old location of the cells, the video mosaic client may maintain a table of the original cell locations and the new cell locations. In this way, the mosaic client may associate incoming screen data with the correct cell in the newly rendered page. If the blacked out cells are removed without a change in location of the remaining cells, the video mosaic client may simply ignore or drop any screen data received for the removed cells.

Figure 7:
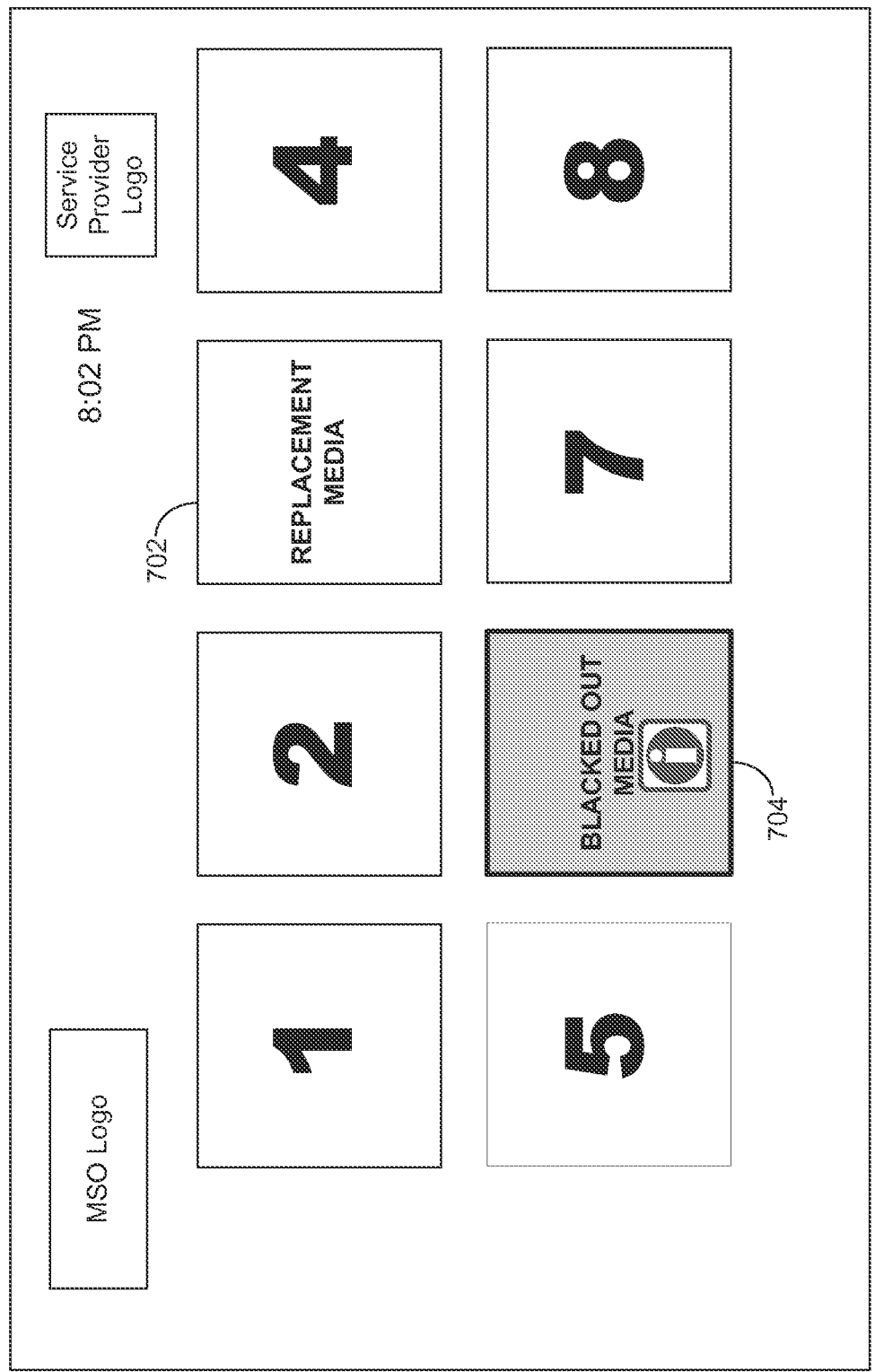
FIG. 7 is an illustrative display screen showing the user selection of a blacked out cell in accordance with one embodiment of the present invention.

FIG. 7 shows illustrative mosaic page 700 with blacked out cells 702 and 704. Blacked out cell 704 may be masked with a gray or black overlay while blacked out cell 702 may contain replacement media content. As described above, in some embodiments, the mosaic client may not permit selection of a blacked out cell. In other embodiments, a user may highlight or select a blacked out cell in the same manner as any other mosaic cell. For example, as shown in FIG. 7, a user may move a cursor using input device 38 (FIG. 1A) and select cell 704. Upon selecting cell 704, one or more overlays of blackout options may be presented to the user, as described in more detail below.

FIG. 8 shows illustrative mosaic display 800 in accordance with one embodiment of the invention. Upon selecting a blacked out cell, such as cell 704 (FIG. 7) options overlay 802 may be presented to the user. The overlay may identify the blacked out content in title area 801. Title area 801 may include the title, channel, and/or broadcast time of the blacked out content, or any other suitable information. Below title area 801 several options may be presented to the user. These options may include view replacement media option 804, search for similar media option 806, purchase tickets option 808, record the blacked out content 810, and show summary information option 812.

Upon selecting view replacement media option 804, the user may be presented with replacement media listed in replacement media selection 805. To view more replacement media selections, the user may select more option 807. In some embodiments, the user may select replacement media selection 805 to be presented with one or more other options for replacement media. In the case of an affiliate protection blackout, the replacement media may be the same event as broadcast by the locally-authorized network. After the user selects view replacement media option 804, the replacement media identified by replacement media selection 805 may be substituted in the selected blacked out cell. In other embodiments, upon selecting option 804, the user exits the mosaic application and is tuned directly to the selected replacement content in full-screen mode.

If the user wishes to locate other media content similar to the content in the blacked out cell, the user may select search for similar media option 806. Upon selecting search for similar media option 806 the video mosaic client may access interactive application data, such as interactive media guidance application content listings, and search the data for media similar to the media listed in title area 801. Similar content may be found, for example, by initiating a title search of keywords included in the title listed in title area 801. The video mosaic application may also use other media information, such as actor, director, and genre information (also derived from media guidance application data), in order to construct a search string. In some embodiments, this search string may be presented to the user. The user may then refine the search string by adding, or removing search criteria, as desired. To determine the similarity between media, a distance may be calculated between other media content and the blacked out content. The distance may represent the similarity between the media. For a description of systems and methods that determine the similarity between media content using distances, see U.S. patent application Ser. No. 11/324,147, filed Dec. 29, 2005, which is hereby incorporated by reference herein in its entirety. The results of the similar media search may be presented to the user in one or more display screens or overlays (not shown).

In some embodiments, to locate other content for a media search, video mosaic client 31 (FIG. 1A) may interface with the media guidance application database resident on the user equipment 30 (FIG. 1A). This database may contain, for example, content listing information, including channel/source information, start and stop times, and detailed program information. The database may hold data relating to programs and content currently accessible by the user equipment as well as programs and content that will be accessible in the near future (e.g., within the next 5 days). The video mosaic client may interface with this database through a series of API function calls. The function calls may support database searches, database additions, and database deletions. The API function calls may also return program and content information to the video mosaic client for display in an overlay or object in a video mosaic page. In some embodiments, the list of similar media content may be transmitted as part of the VRN screen data.

The user may also purchase tickets by selecting option 808 in overlay 802. This option may link the user to one or more display screens or overlays containing a detailed description of the blacked out content, the length and reason for the blackout, and any other suitable information. In the example of FIG. 8, option 808 provides the user an opportunity to purchase tickets to a blacked out sporting event listed in title area 801 or other future events related to the blacked out event. In the example of FIG. 8, the blacked out event may be a live baseball game, such as the Boston Red Sox at the New York Yankees. Upon selecting option 808 to purchase tickets, tickets to future Boston Red Sox or New York Yankees games may be purchased. For example, the user may be linked directly to a ticket distribution website for purchasing tickets. Additionally or alternatively, the user may be directed to an online auction website for placing a bid on tickets. The control data may include the URL of the website or websites. The URL contained in the control data may additionally include filter criteria to narrow the user's search for tickets and facilitate navigation. For example, the URL may include "www.tickets.com/sports/baseball/," which may bring the user to a ticket distribution website, defaulting at the baseball ticket page. Tickets for other events and performances may also be purchased via option 808.

The user may also select to record the blacked out content by selecting record option 810. After selecting record option 810, the blacked out content may be recorded to a local recording or storage device, such as recording device 36 (FIG. 1A). Alternatively, the blacked out content may be recorded to or made available on a remote storage device, such as a storage device in distribution facility 21 (FIG. 1A) or central facility 10 (FIG. 1A). In some embodiments, if the blacked out content will be available remotely (e.g., via an on-demand service), the content is not recorded locally, but rather accessed from the remote location after the blackout is lifted. If the user selects to record blacked out content after the content has started, the missing portion of the content may be immediately transmitted to the user's equipment so that the user's equipment contains a complete copy of the blacked out content. For example, a network server (e.g., an on-demand server) may buffer or record all video mosaic content until the content fully broadcast. In the event that a user selects to record blacked out content, the user equipment may access the complete version of the blacked out content (or any portion thereof) in order to make the complete asset available to the user at the conclusion of the blackout. The complete version of the asset may be available locally or from a remote server.

Figure 9:
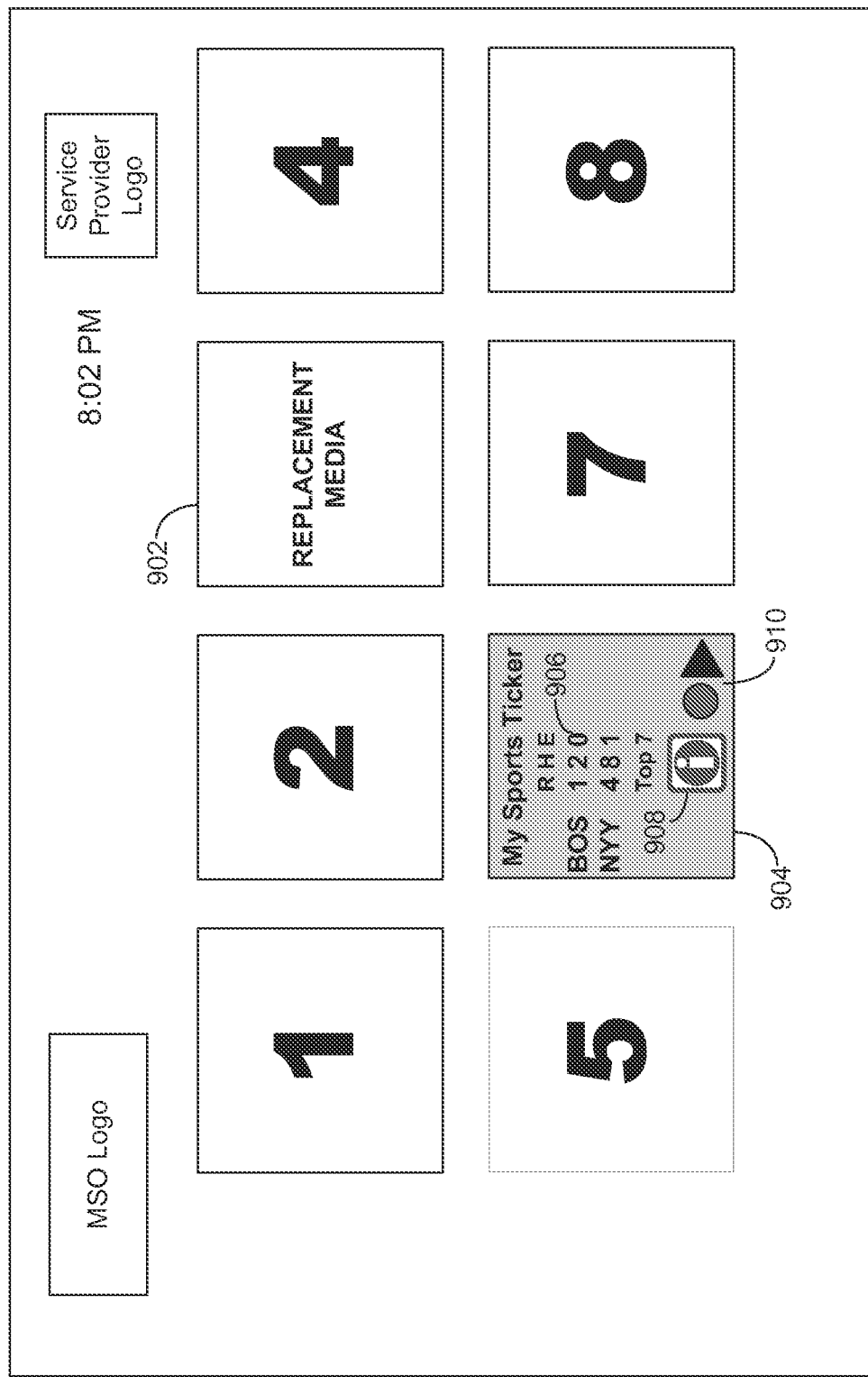
FIG. 9 is an illustrative display screen showing a summary information cell in place of a blacked out cell in accordance with one embodiment of the present invention.

FIG. 9 shows illustrative mosaic display screen 900 with a summary information cell. Display screen 900 may be similar to display screen 700 except that cell 904 may display summary information instead of a blacked out cell. Cell 902 may also display summary information or replacement media. The summary information displayed in cell 904 and/or 902 may include video highlights, audio or video commentary, an RSS data feed (or other suitable feed), or any other suitable information about the blacked out content. In the example of FIG. 9, cell 904 corresponds to a blacked out baseball game and shows summary information in the form of sports ticker 906. Sports ticker 906 may include any suitable information relating to the blacked out game, including the current score, inning, hits, and error information (or other information related to the particular sport of the blacked out content). Ticker 906 may also include play-by-play information in the form of a scrolling text field.

By selecting more information icon 908, the user may be presented with more details on the blackout and the blacked out media asset. For example, the type of blackout and its duration may be presented in an overlay (not shown) after the user selects more information icon 908. Icon area 910 may include an icon indicating that the blacked out media is currently being recorded. The user may select the record icon in icon area 910 to pause or start the recording, if desired. The user may also press the play icon in icon area 910 to start watching the recorded asset, if permitted by the blackout. In some embodiments, the play icon may automatically appear in icon area 910 after the blackout window has expired, permitting the user to watch the previously blacked out content.

Figure 10:
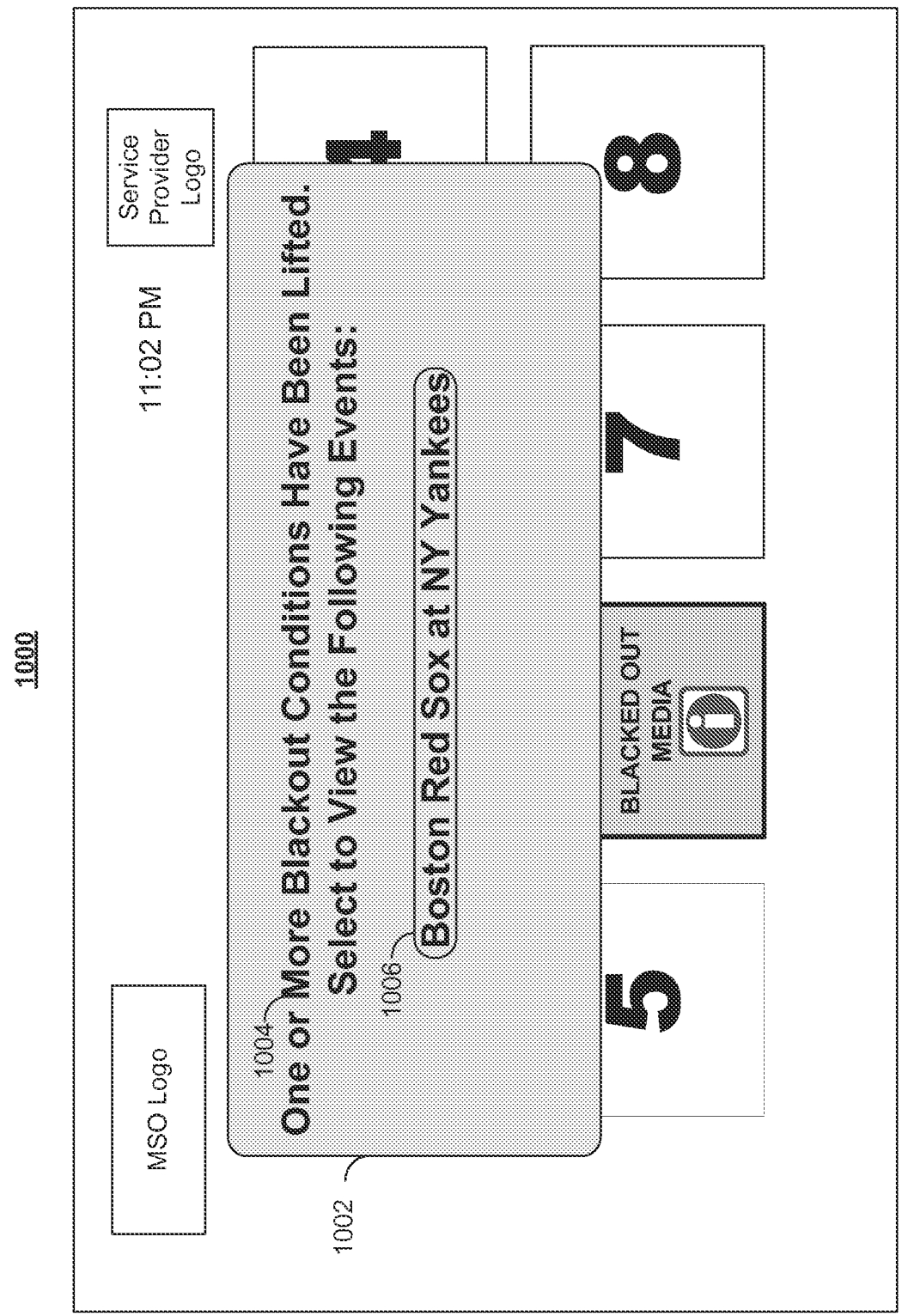
FIG. 10 is an illustrative display screen showing a blackout expiration notification in accordance with one embodiment of the present invention.

FIG. 10 shows illustrative blackout notification display screen 1000. Screen 1000 includes notification overlay 1002, which may be displayed after a blackout has expired, after the blacked out content is recorded locally or remotely, or both after the blackout has expired and the blacked out content has been recorded. Notification overlay 1002 may include information 1004, which may inform the user that one or more blackouts have been lifted. Information 1004 may also identify the type of blackout (e.g., a venue protection blackout). Below information 1004, the name of the previously blacked out content is displayed. A user may select any content in the list, such as content selection 1006, to immediately watch the previously blacked out content. If the content is not stored locally, the content may be accessed from a remote location using an on-demand service. In this way, the user is able to watch the blacked out content as soon as the content is no longer blacked out.

Figure 11:
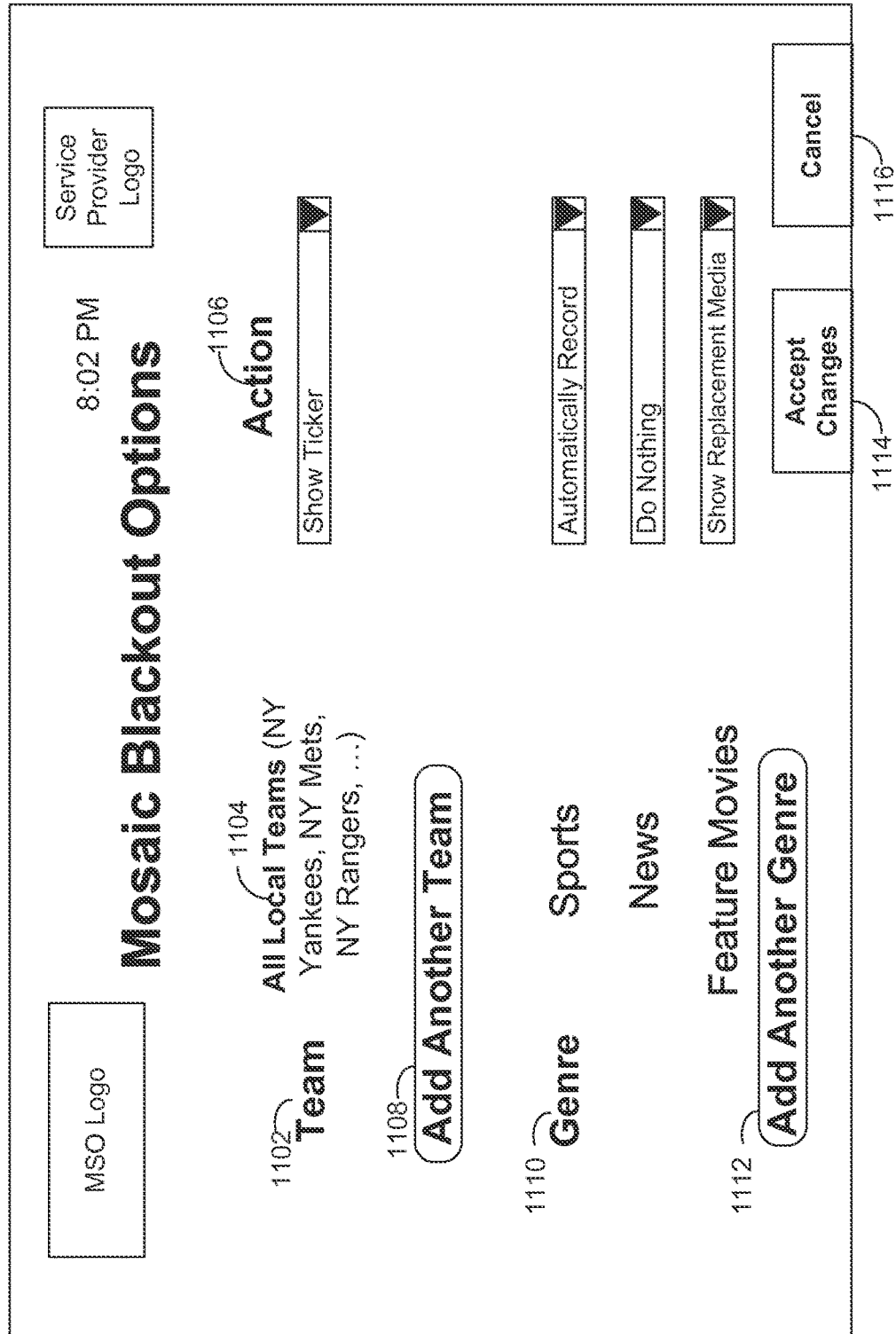
FIG. 11 is an illustrative display screen showing video mosaic blackout options in accordance with one embodiment of the present invention.

FIG. 11 shows illustrative video mosaic blackout options display screen 1100. The options presented in display screen 1100 may affect the layout of all mosaic screens presented on the user's equipment or a subset of specific mosaic screens. For example, the settings shown in FIG. 11 may apply to a single user and only affect personalized mosaic pages like homepage 300, but not general mosaic pages displayed to all users of user equipment 30 (FIG. 1A). In other embodiments, the settings shown in FIG. 11 may apply to all mosaic screen presented on the user equipment.

The settings in display screen 1100 may control what content is presented in blacked out mosaic cells and, optionally, what actions are automatically taken when the mosaic client determines a mosaic cell should be blacked out. The actions listed in action column 1106 may include such actions as "show ticker," which presents a sports ticker of summary information in place of the blacked out content in a mosaic cell. Other actions may include "automatically record," which instructs the mosaic client to automatically record content that is determined to be blacked out to the user equipment 30 (FIG. 1A) or a remote location (e.g., distribution facility 21 or central facility 10 (both of FIG. 1A). As described above, a record instruction may record the entire asset, including any portion of the asset that was already broadcast. A server (e.g., an on-demand server) within system 100 (FIG. 1A) may buffer or cache all content presented in a mosaic page. In some embodiments, the content is automatically deleted from the server after the completion of the broadcast. For example, the server may remove a sporting event saved to the server after the event has completed and is no longer being presented in a mosaic page. In other embodiments, the server may maintain copies of the event after the event has ended. These copies may be made available to users via, for example, on-demand or pay-per-view services.

As shown in the example of FIG. 11, some illustrative mosaic blackout options may include performing a specified action for the one or more selected sports teams listed in team row 1102. A user may select one or more of the user's favorite teams in team selection 1104, or the user may choose one of the predetermined collections of teams (e.g., "all local teams"). To add a new team, the user may select new team option 1108. The user may then specify a designated action to associate with the teams selected in team selection 1104. For example, a sports ticker may be displayed in the place of the blacked out cell if the blacked out cell is presenting a blacked out sporting event with one of the selected teams, as shown in FIG. 9. This way, the user may still be presented with some summary information about the game even though the game is blacked out on the user's equipment. Other actions may include "show highlights," "present audio only," "show commentary," "show replacement media," "automatically record," any other suitable action that is not in violation of the blackout, or any combination thereof.

In addition to selecting one or more teams, the user may also select one or more genres to associate with an action. In the example of FIG. 11, the user has selected the sports, news, and feature movie genres in genre area 1110. To add another genre, the user may select new genre option 1112. Regardless of whether a team, genre, or other category is selected, video mosaic client 31 (FIG. 1A) may receive incoming application or program schedule data and compare the incoming data to the user's selections in display screen 1100. For example, as described below, each mosaic page may be associated with screen data that defines the individual cell elements of the page. Using this screen data, the mosaic client may identify the content presented in each cell (or the content not presented because of a blackout). The mosaic client may then access application or program schedule data from an application or program schedule database on user equipment 30 (FIG. 1A). This program schedule database may include extended asset information, such as genre, title, author, director, rating, and actor information about the content displayed in the mosaic cells. A comparison of this data with the user's selections in display screen 1100 may enable the mosaic client to automatically take the appropriate action when content matching one or more of the user's selections are presented in a mosaic page.

The user may use input device 38 (FIG. 1A) to move a cursor around display screen 1100 and make the desired selections. In order to save the settings displayed in display screen 1100, the user may select accept changes button 1114. After selecting accept changes button 1114, a profile may be created (or updated) for the user or for all users of the user equipment. This profile may contain the user's blackout options and desired actions. To discard the changes made in display screen 1100, the user may select cancel button 1116.

In general, the video mosaic client needs only some identification of the source of the objects being presented in a video mosaic page and a set of blackout rules to effectively blackout mosaic objects. However, because blackouts are often time-based, maintaining a complete set of blackout rules on the user equipment may require frequent updates and a large amount of bandwidth. Therefore, in some embodiments, a blackout flag structure is used that approximates the blackout rules. An illustrative blackout flag structure is detailed in U.S. patent application Ser. No. 11/395, 380. For example, blackout rules for National Football League games may require that any broadcaster that has a signal that reaches within a 75-mile radius of an NFL stadium blackout all games at the stadium that are not sold out 72 hours or more before the start of the game. Other, more complex blackout rules may also apply. By using the blackout flag structure, the video mosaic client can estimate these complex rules and enforce the programming blackout.

Figure 12:
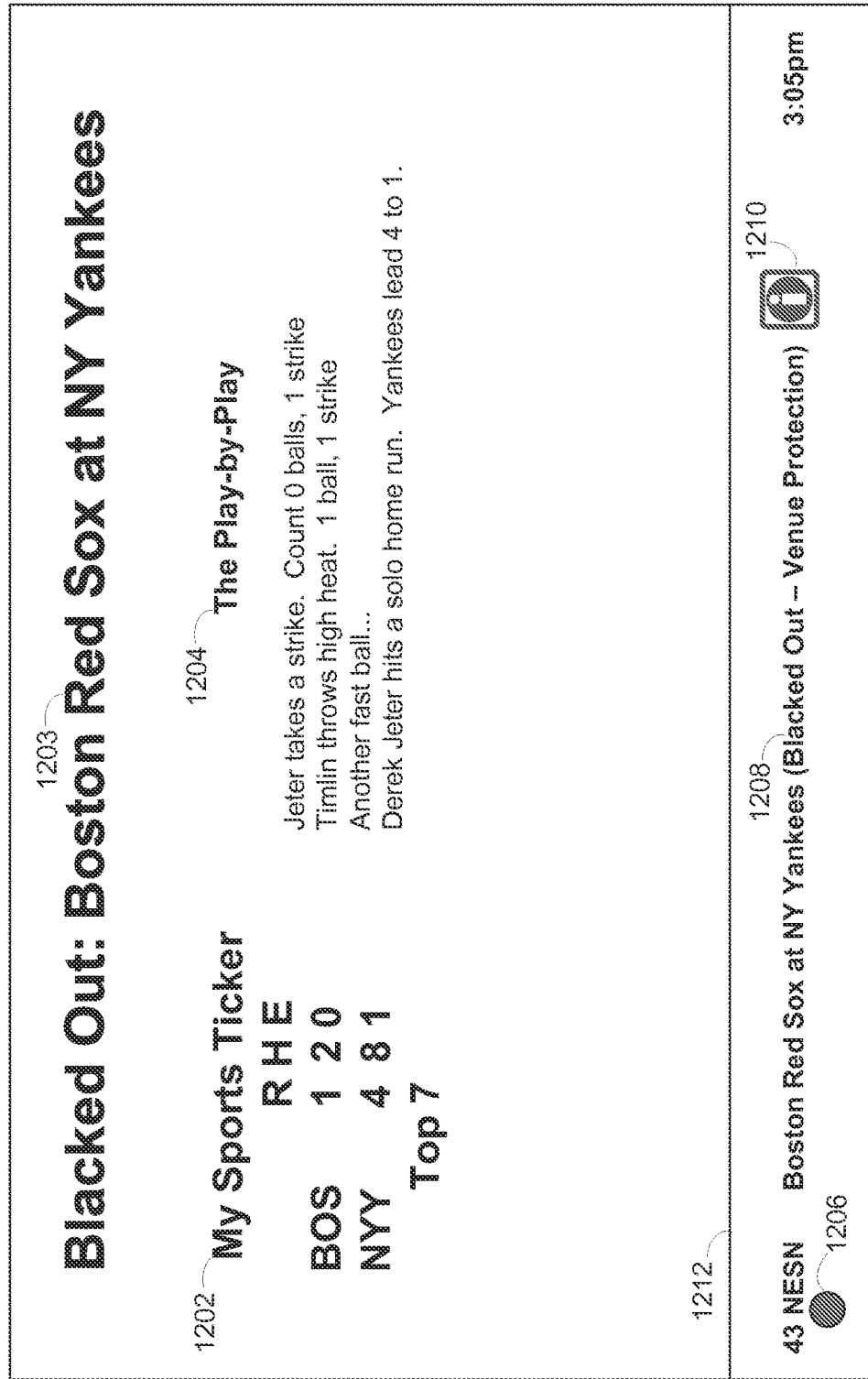
FIG. 12 is an illustrative display screen showing full-screen summary information that is displayed to a user in response to accessing a channel showing blacked out content.
Figure 13:
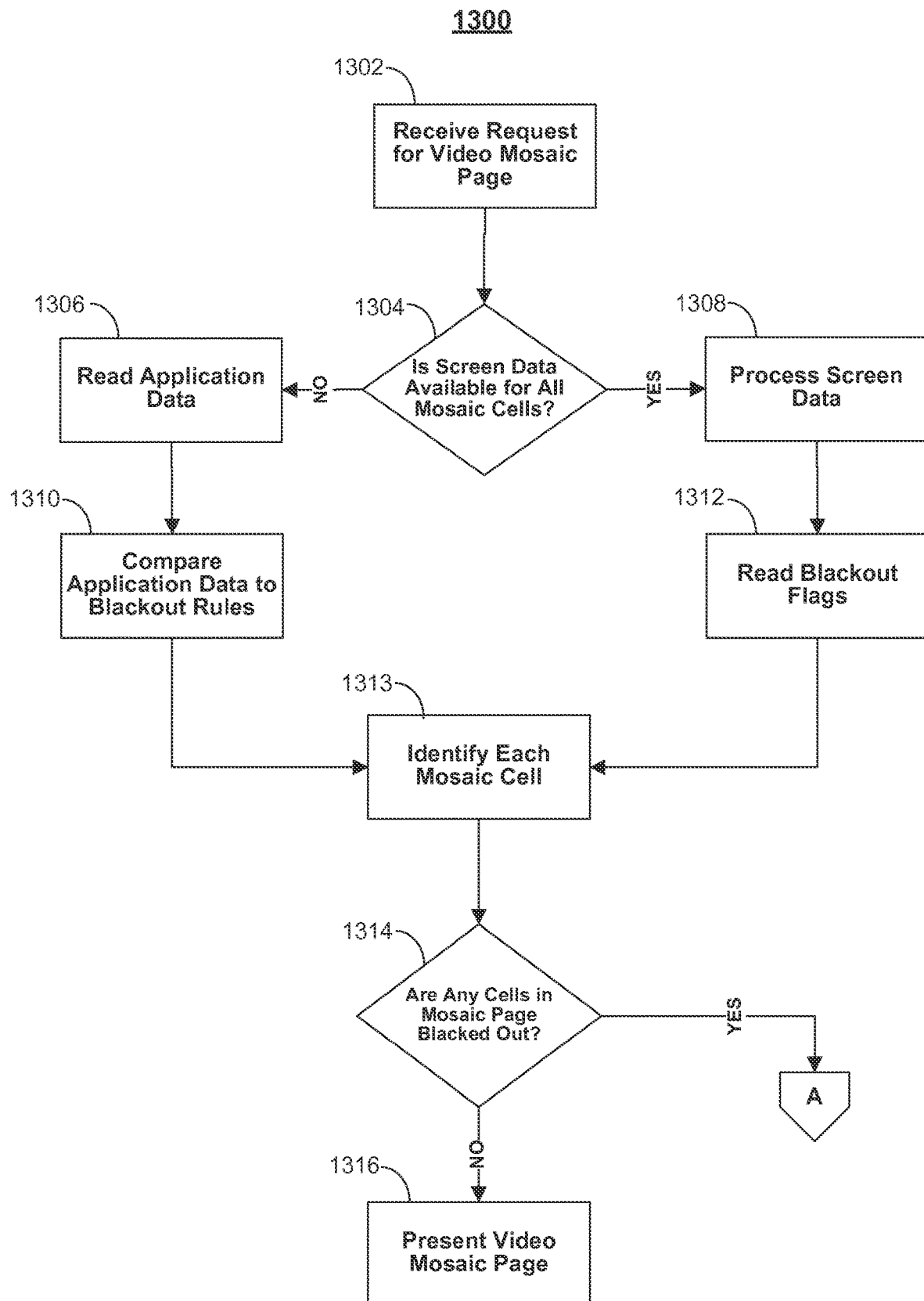
FIGS. 13-16 show illustrative processes for supporting blackout functionality in video mosaic pages in accordance with one embodiment of the present invention.

FIG. 12 shows illustrative display screen 1200 for presenting full-screen summary information to a user. Although the prior embodiments described enhanced blackout support for video mosaic screens and pages, the features and functionality of the present invention may also be applied to full-screen programming, including programming available via television channels. For example, a user may access a channel that is currently showing blacked out content. The interactive media guanidine application may determine which channels are currently showing blacked out content from media guidance application data associated with the requested channel. With typical systems, a black or blank screen might be displayed to the user after the user switches to a television channel showing blacked out content. The blank or black screen may be displayed because the actual channel content was removed at a cable headend or other distribution facility (e.g., distribution facility 21 of FIG. 1A) before being delivered to the user equipment.

In some embodiments, an interactive media guidance application may monitor user channel access requests. After a channel is requested that is showing blacked out content, the interactive application may access supplemental content, including summary information, from one or more real-time data feeds. For example, the summary information may be transmitted in-band or out-of-band from central facility 10 or distribution facility 21 to user equipment 30 (FIG. 1). In some embodiments, this summary information may be transmitted to the user equipment using some or all of the bandwidth allocated for the channel showing the blacked out content.

As shown in the example of FIG. 12, the user has accessed the NESN channel to watch the Boston Red Sox at NY Yankees baseball game. Flip banner 1212 may display the name of the content, a short description, or any other suitable information of potential interest to the user. Flip banner 1212 may also display an indication that the content is currently blacked out. For example an icon or alert message may be displayed. As shown in flip banner 1212, an indication that the channel is blacked out as well as the blackout type (e.g., bandwidth blackout, venue protection blackout, or affiliate blackout) are displayed after the title of the blacked out content at label 1208. More information icon 1210 indicates to the user that additional information about the blackout is available. By pressing an "Information" button on an available input device (e.g., input device 38 of FIG. 1), one or more additional screens of information about the blackout (e.g., indicating the blackout duration, the reason for the blackout, etc.) may be displayed. This additional information may also include links substitute programming of interest and other replacement content (e.g., other baseball games that are not currently blacked out).

Icon 1206 may indicate to the user that the blacked out content is being recorded locally (or on a remote location) and will be made available as soon as the blackout expires. For example, the blacked out content may be accessed and recorded locally to the user equipment via an on-demand service. As another example, the blacked out content may be made available on a network media server accessible by the user equipment for immediate playback after the blackout expires. If the blacked out content is stored locally at the user equipment device, the interactive media guidance application or the video mosaic client may enforce access restrictions on the locally recorded content so that the content is not accessed or displayed in violation of the blackout.

In lieu of displaying a black or blank screen when the user requests a channel showing blacked out content, a screen of summary information about the blacked out content may be displayed. This summary information may provide detailed, real-time information about the blacked out content. For example, if the blacked out content is a sporting event, sports ticker 1202 may be displayed. This ticker may be similar to ticker 904 (FIG. 9). The data for the ticker may be received from one or more real-time data feeds, or the data may be transmitted in the same bandwidth that was reserved for the requested channel showing the blacked out content. In addition to showing summary information, detailed play-by-play information may also be provided in area 1204. Associated audio (e.g., a voice over stream) may also be associated with the detailed play-by-play textual information, if such content is not in violation of the blackout. Title 1203 may indicate the name and/or venue of the blacked out content.

The information shown in display screen 1200 may be displayed in a number of ways. In some embodiments, an overlay may be generated by the interactive media guidance application (or video mosaic client) that replaces all or a portion of the requested channel output (i.e., the blank or black screen). The overlay could be a transparent overlay that is overlaid directly on top of the blacked out content. In other embodiments, a replacement video stream is transmitted to the user equipment on the channel showing the blacked out content. For example, display screen 1200 may be transmitted in place of the blacked out content so that the screen may be presented as if it were a typical channel output display. In some embodiments, this replacement stream may be transmitted to the user equipment over the same bandwidth reserved for the channel showing the blacked out content. In this way, the user may be provided with detailed (and real-time) summary information about the blacked out content instead of a blank or black screen.

FIGS. 13-16 show illustrative process 1300 for presenting a video mosaic page. At step 1302, a request is received for a video mosaic page. For example, the user may press a "Home Page" button on input device 38 (FIG. 1A) to be presented with mosaic homepage 400 (FIG. 4). At step 1204, video mosaic client 31 (FIG. 1A) may determine if screen data is available for all the mosaic cells in the requested page. As described above, some mosaic pages may not include screen data, or some pages may include screen data for less than all of the cells in the page. An example of a mosaic page that may not be associated with screen data is a locally-generated page.

If screen data is available at step 1304, the screen data may be processed at step 1308. For example, video mosaic client 31 (FIG. 1A) may receive and parse the screen data for blackout flags at step 1312. The screen data may be received in-band with the mosaic page or out-of-band. If screen data is not available at step 1304, application data may be read at step 1306. For example, application data source 40 (FIG. 1A) may provide application data specifically for mosaic pages. In some embodiments, the application data may include media guidance application data used by an interactive media guidance application resident on the user equipment. The application data may be used to identify the source of the content in each cell of the requested mosaic page. Then at step 1310, the application data is compared to a set of blackout rules. The blackout rules may be stored locally on user equipment 30 (FIG. 1A) or at a remote location (e.g., central facility 10 or distribution tactility 20, both of FIG. 1A). From the screen data or application data, the source of each video asset in the mosaic page may be determined at step 1313. For example, the screen data may include source identifiers that identify each cell in the mosaic page. Additionally or alternatively, metadata flags may be defined in the application data and associated with the cells in the mosaic page. From the blackout flags or the blackout rules, video mosaic client 31 (FIG. 1A) may determine if any cells in the requested mosaic page are to be blacked out at step 1314. For example, as described in U.S. patent application Ser. No. 11/324,147, blackout flags may include blackout source identifiers, blackout channel identifiers, blackout network addresses, and blackout controller identifiers that are used to determine if the cell should be blacked out. If the mosaic client determines that no cells should be blacked out at step 1314, the mosaic page may be displayed to the user at step 1316.

Figure 14:
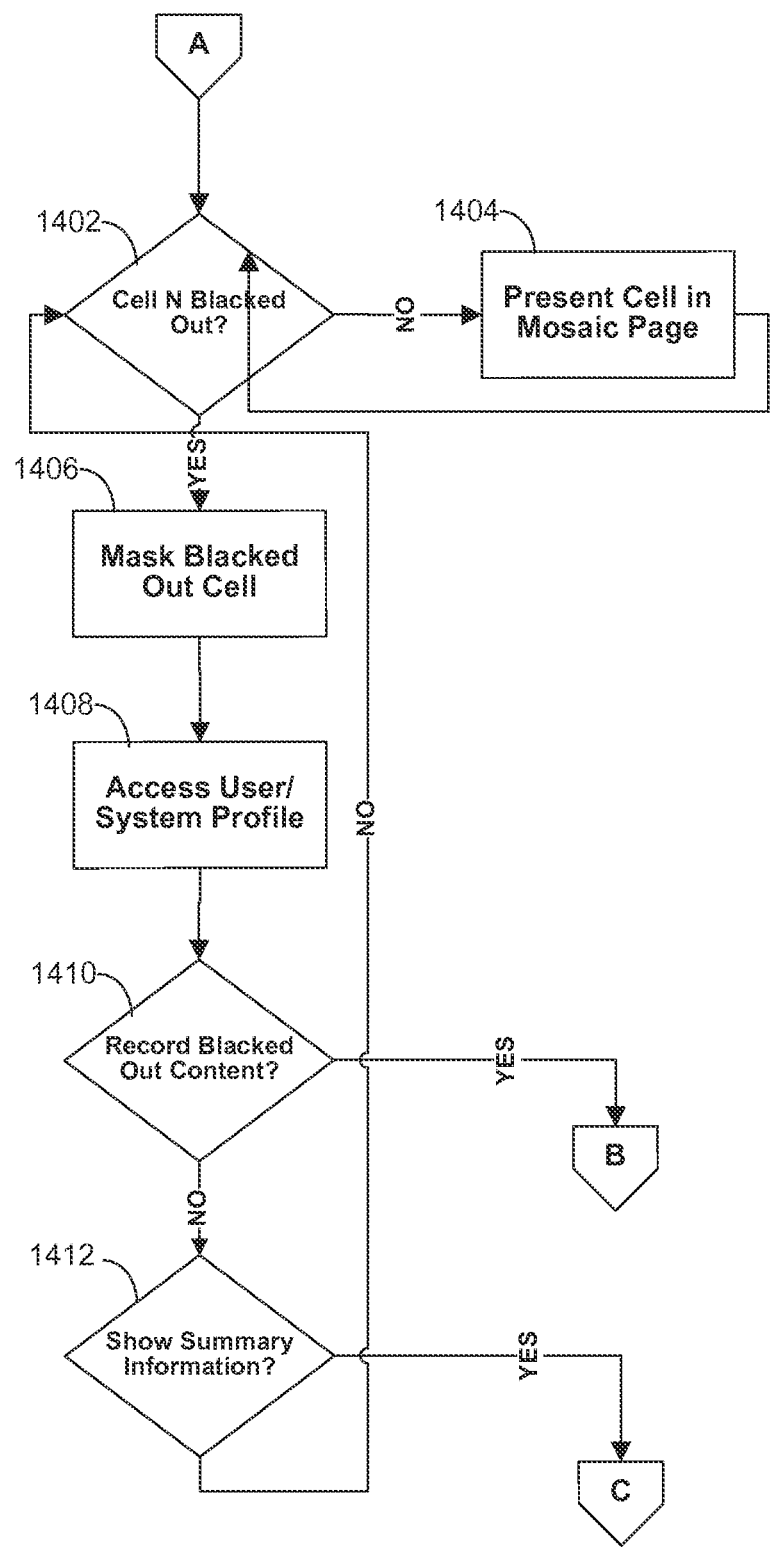

If, at step 1314, the mosaic client determines that at least one cell should be blacked out, the process may continue in FIG. 14. At step 1402, the mosaic client may determine if the first cell on the page should be blacked out. If the cell should not be blacked out, it may be displayed at step 1404. For the cells that should be blacked out, mosaic client 31 (FIG. 1A) may mask the cells at step 1406. For example, cell 504 (FIG. 5) shows a gray overlay over a blacked out cell. In addition, the cell's audio may be blocked. The mosaic client may then access the user's profile (or the system profile if only one profile exists on the user equipment) at step 1408. As described above with regard to FIG. 11, this profile may include the user's blackout preferences. At step 1410, the mosaic client may determine, from the user profile, if any assets that are blacked out in the mosaic page should be recorded. If one or more assets should be recorded, the illustrative process may continue in FIG. 15.

If it is determined that the user does not wish to record the blacked out content at step 1410, at step 1412 the mosaic client may determine if the user has selected to display summary information in place of the blacked out cell. For example, the user may select to show a sports ticker, video highlights, or some other information about the blacked out content using blackout options display screen 1100 (FIG. 11). This summary information may not violate the terms of the blackout. If summary information is selected to be displayed, the illustrative process may continue in FIG. 16.

Figure 15:
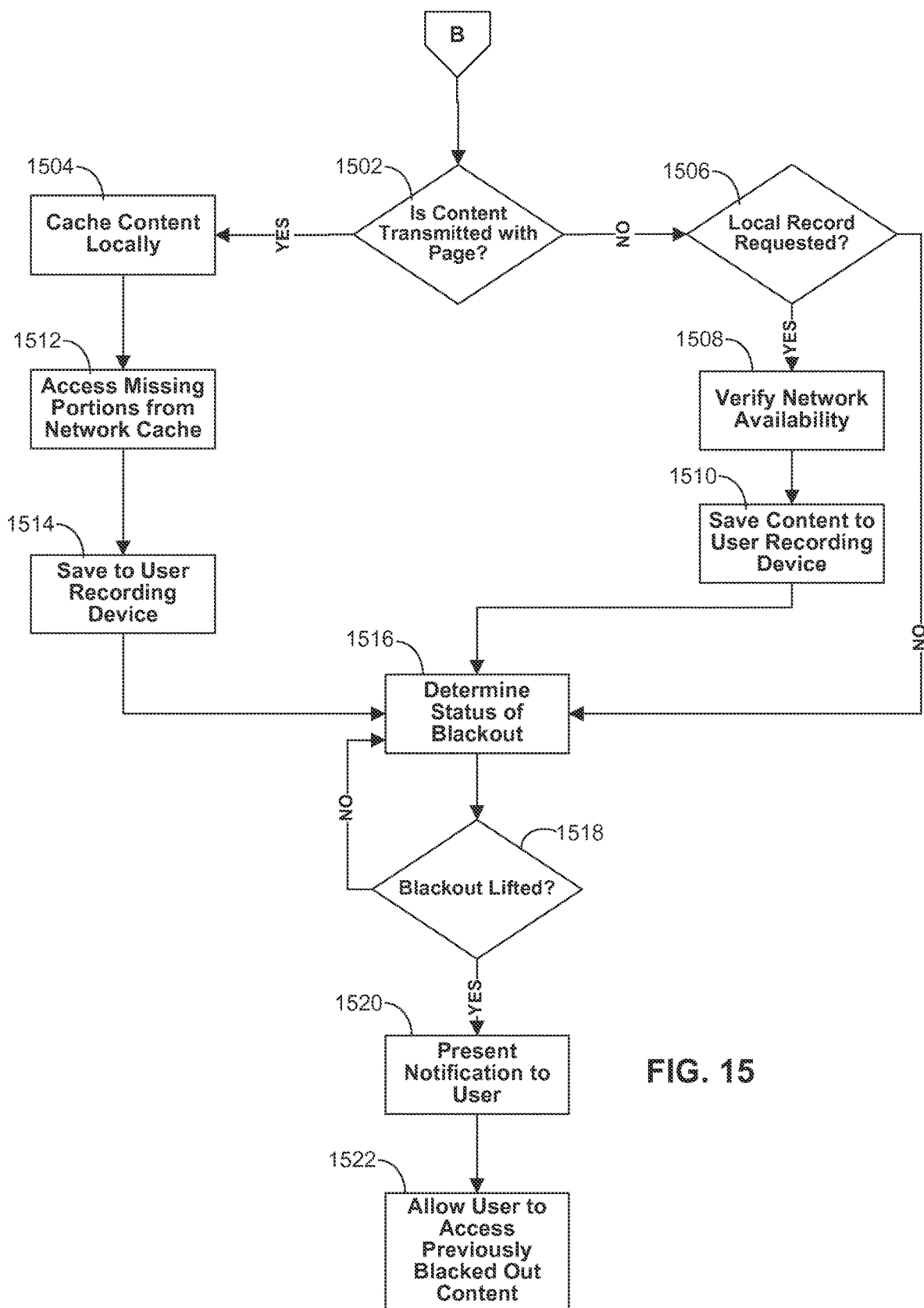

Referring now to FIG. 15, at step 1502, video mosaic client 31 (FIG. 1A) may determine if the blacked out content to be recorded is available in the transmitted page. For example, remotely-generated mosaics may have the video sources composited remote from the user equipment. As such, the same composited source may be transmitted to all users requesting the mosaic page, regardless of blackout conditions. If the content is actually transmitted with the page, the source corresponding to the blacked out content to be recorded may be identified and cached locally at step 1504. Any portion of the content that was transmitted prior to the start of recording may be accessed from a network cache at step 1512. In this way, the user may be provided with the entire blacked out content. At step 1514 the content may be saved to a user recording device. For example, the locally cached content and any missing portions may be combined and saved to recording device 36 (FIG. 1A).

If the content itself is not transmitted with the page, at step 1508 the mosaic client may verify the network availability of the content. For example, the blacked out content may be made available via an on-demand service or the content may be stored on a network media server. The mosaic client may then request the content, and the blacked out content may then be transferred to the local user equipment and saved to a user recording device, such as recording device 36 (FIG. 1A). In some embodiments, if a network copy of the content is available (or will be available after the blackout expires), the content may not be recorded locally, but rather it may be made available to the user via an on-demand service when and if the user requests the content. In this way multiple users may share a single copy of the blacked out content, thereby reducing network bandwidth.

At step 1516, the mosaic client may determine the status of the blackout. For example, screen data may be time-synchronized. The mosaic client may process new screen data as it arrives or process screen data periodically (e.g., every 3 seconds). The mosaic client may also re-evaluate the blackout rules to see if the blackout has since expired. At step 1518, if the blackout condition has been lifted, a notification may be presented to the user at step 1520. For example, overlay 1002 may be presented to the user. The notification may inform the user that the blackout has expired. The notification may also inform the user that the previously blacked out content is now available for viewing—either from a network location or locally. The notification may include a visual and/or audible alert. Such a visual alert may appear in icon area 910 (FIG. 9). Additionally or alternatively, a remote notification may be delivered to one or more of the user's remote user equipment devices (e.g., cellular telephone, PDA, or mobile computing device). For example, an email message, fax, telephone call, SMS message, or any other suitable wired or wireless message may be transmitted to a remote user indicating that the blackout period has expired and/or the availability of recorded blacked out content. The remote notification may also take the form of an overlay or other visual indicator on a remote user equipment device that the user is logged onto. Central facility 10 (FIG. 1A) may maintain a record of user logins and remote user addresses (e.g., telephone numbers, email addresses, and network addresses). This record of user logins and addresses may be used to determine which user equipment device any given user is currently accessing. The remote notification may be transmitted directly from user equipment 30 (FIG. 1A) over the Internet or other communications network, or may be sent first to distribution facility 21 over path 28 (FIG. 1A). Distribution facility 21 may then relay the notification to the remote user over any available communications network. At step 1522, the user is then allowed to access the previously blacked out content. After the process shown in FIG. 15 is complete (or at any point during the process shown in FIG. 15), in some embodiments, the process (or a separate process) may resume at step 1412 (FIG. 14) to determine if the user would like to display summary information in addition to recording the blacked out content. These two processes may branch and execute simultaneously so that, for example, one thread of the video mosaic client application determines if the blacked out content should be recorded, and another thread of the video mosaic client application determines if summary information should be additionally or alternatively displayed.

Figure 16:
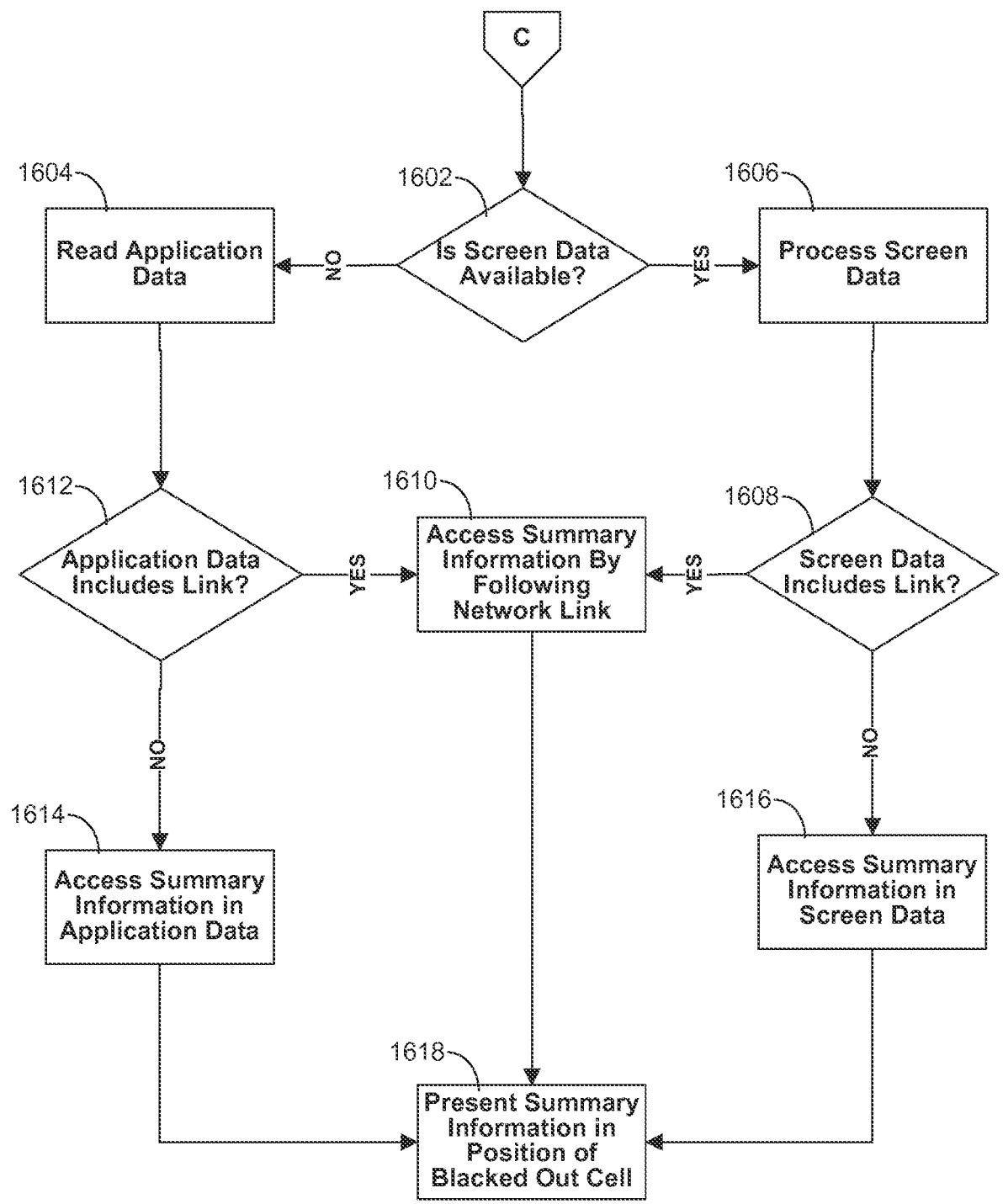

Referring now to FIG. 16, if the user requests to view summary information in the cell that the blacked out content would be displayed in, at step 1602 the mosaic client may determine if screen data is available for the blacked out cell. If screen data is available, at step 1606 the screen data may be processed. If screen data is not available, application data (e.g., from application data source 40 (FIG. 1A)) may be read at step 1604. As described above, in some embodiments, the summary information itself is inserted into the screen data or application data. In other embodiments, links to the summary information may be included in the screen data or application data. If at step 1612, the mosaic client determines that the application data includes a network link, or if at step 1608 the screen data includes a network link, the summary information may be accessed at step 1610 by following the link. For example, links to supplemental network data or video feeds, RSS feeds, or any other information or video stream may be included in the screen data or application data. Otherwise, the summary information may be accessed directly from the screen data at step 1616 or the application data at step 1614. In some embodiments, a single mosaic page may include both summary information within the screen data or application data and links to summary information. Typically, the decision to include a link or the actually summary data in the screen or application data may be dictated by the size of the summary information, available bandwidth, speed of connection, and other network considerations. Finally, at step 1618 the summary information is presented to the user in the position of the blacked out cell.

In some embodiments, more than one type of summary information may be provided for each blacked out cell. For example, sports ticker data, commentary videos, and highlight videos may all be included in the screen data or application data (or links to such types of summary information). In these embodiments, the user may select which type of summary information to display. The user may also change which type of summary information is currently displayed in the blacked out cell by scrolling through the available summary information types. For example, the user may press a left or right arrow key on input device 38 (FIG. 1A) while a blacked out cell is selected to be presented with other types of summary information.

In practice, one or more steps shown in process 1300 may be combined with other steps, performed in any suitable order, performed in parallel (e.g., simultaneously or substantially simultaneously) or removed.

The above described embodiments of the present invention are presented for purposes of illustration and not of limitation, and the present invention is limited only by the claims which follow.

What is claimed is:

1. A method for providing enhanced blackout support, the method comprising:

receiving, via a communication interface, a request from a user to access a media asset from a video mosaic screen comprising a plurality of media assets;

in response to determining that the requested media asset is subject to the blackout on the user equipment device, generating for display a first option to record the requested media asset for later access;

in response to receiving a selection of the first option to record from a user:

recording a first portion of the requested media asset from a time when the selection is received;

receiving, from a server, a second portion of the requested media asset that has been transmitted prior to the time when the selection is received;

determining that the media asset is no longer subject to the blackout on the user equipment device;

determining that the media asset is available for viewing; and in response to determining that the media asset is no longer subject to the blackout on the user equipment device and that the media asset is available for viewing, notifying the user that the media asset is no longer subject to the blackout on the user equipment device and that the media asset is available for viewing.

2. The method of claim 1, further comprising:
in response to receiving a selection of the option from a user:
without further user input, automatically constructing a search string for substitute media assets related to the media asset; and
generating for display links to the substitute media assets available for playback in place of the media asset based on the search string.

3. The method of claim 1, further comprising:
receiving a request from the user to access the media asset; and
in response to receiving the request from the user to access the media asset, generating for display the media asset.

4. The method of claim 1, wherein receiving the request from the user to access the media asset comprises receiving the request from the user to access the media asset with a mobile user equipment device that is different from the user equipment device.

5. The method of claim 1, further comprising retrieving the media asset from an on-demand service.

6. The method of claim 1, further comprising:
notifying the user that the media asset is available for viewing by transmitting a wireless message to the user.

7. The method of claim 1, further comprising associating a media asset genre with an action to perform for media assets matching the media asset genre when the media assets matching the media asset genre are blacked out.

8. The method of claim 1, further comprising providing an option to the user to purchase tickets for an event related to the media asset.

9. The method of claim 1, further comprising:
in response to determining that the media asset is subject to the blackout, presenting at least one of audio- and text-only streams in place of the media asset.

10. A system for providing enhanced blackout support, the system comprising:
a communication interface configured to receive a request from a user to access a media asset from a video mosaic screen comprising a plurality of media assets;
display circuitry configured to:
in response to determining that the requested media asset is subject to the blackout on the user equipment device, generate for display a first option to record the requested media asset for later access;
processing circuitry configured to:
in response to receiving a selection of the first option to record from a user:
record a first portion of the requested media asset from a time when the selection is received;
receive, from a server, a second portion of the requested media asset that has been transmitted prior to the time when the selection is received;
determine that the media asset is no longer subject to the blackout on the user equipment device;
determine that the media asset is available for viewing; and
in response to determining that the media asset is no longer subject to the blackout on the user equipment device and that the media asset is available for viewing, notify the user that the media asset is no longer subject to the blackout on the user equipment device and that the media asset is available for viewing.

11. The system of claim 10, wherein the processing circuitry is further configured to:
in response to receiving a selection of the option from a user: without further user input, automatically construct a search string for substitute media assets related to the media asset; and
generate for display links to the substitute media assets available for playback in place of the media asset based on the search string.

12. The system of claim 10, wherein the processing circuitry is further configured to:
receive a request from the user to access the media asset; and
in response to receiving the request from the user to access the media asset, generate for display the media asset.

13. The system of claim 10, wherein the processing circuitry is further configured, when receiving the request from the user to access the media asset, to receive the request from the user to access the media asset with a mobile user equipment device that is different from the user equipment device.

14. The system of claim 10, wherein the processing circuitry is further configured to retrieve the media asset from an on-demand service.

15. The system of claim 10, wherein the processing circuitry is further configured to:
notify the user that the media asset is available for viewing by transmitting a wireless message to the user.

16. The system of claim 10, wherein the processing circuitry is further configured to associate a media asset genre with an action to perform for media assets matching the media asset genre when the media assets matching the media asset genre are blacked out.

17. The system of claim 10, wherein the processing circuitry is further configured to provide an option to the user to purchase tickets for an event related to the media asset.

18. The system of claim 10, wherein the processing circuitry is further configured to:
in response to determining that the media asset is subject to the blackout, present at least one of audio- and text-only streams in place of the media asset.

* * * * *